United States Patent
Benise

(10) Patent No.: US 8,854,009 B2
(45) Date of Patent: Oct. 7, 2014

(54) MOBILE TERMINAL, METHOD OF PROTECTING BATTERY, AND BATTERY PROTECTION PROGRAM

(75) Inventor: Kimitaka Benise, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 868 days.

(21) Appl. No.: 13/006,133

(22) Filed: Jan. 13, 2011

(65) Prior Publication Data

US 2011/0312391 A1 Dec. 22, 2011

Related U.S. Application Data

(60) Provisional application No. 61/355,728, filed on Jun. 17, 2010.

(51) Int. Cl.
- *H02J 7/00* (2006.01)
- *H02J 7/02* (2006.01)
- *H01M 10/44* (2006.01)
- *H02J 7/35* (2006.01)
- *H04W 52/02* (2009.01)

(52) U.S. Cl.
CPC .. *H02J 7/027* (2013.01); *H02J 7/35* (2013.01); *Y02E 60/12* (2013.01); *H01M 10/443* (2013.01); *H04W 52/0261* (2013.01)
USPC ........... 320/135; 320/134; 320/136; 320/150; 320/153; 320/154

(58) Field of Classification Search
USPC .......................... 320/134–136, 150, 153, 154
See application file for complete search history.

(56) References Cited

U.S. PATENT DOCUMENTS

| | | | |
|---|---|---|---|
| 2004/0235514 A1* | 11/2004 | Bloch et al. | 455/550.1 |
| 2007/0131268 A1* | 6/2007 | Taniguichi et al. | 136/205 |
| 2007/0140724 A1* | 6/2007 | Kikuchi | 399/88 |

FOREIGN PATENT DOCUMENTS

JP  7-250437  9/1995

OTHER PUBLICATIONS

JP07-250437 Machine translation.*

* cited by examiner

*Primary Examiner* — Samuel Berhanu
(74) *Attorney, Agent, or Firm* — Oblon, Spivak, McClelland, Maier & Neustadt, L.L.P.

(57) ABSTRACT

A mobile terminal apparatus including a battery, a temperature detection section that detects a temperature of the battery, a voltage detection section that detects a battery voltage of the battery, a discharge section discharges the battery, an illuminance detection section that detects an illuminance on the mobile terminal apparatus, and a control section. The control section determines whether to gradually discharge the battery in accordance with the detected illuminance or to rapidly discharge the battery, and the determination is made on the basis of the temperature detected from the temperature detection section and the battery voltage detected from the voltage detection section.

6 Claims, 11 Drawing Sheets

FIG. 3

|  |  | BATTERY TEMPERATURE | |
|---|---|---|---|
|  |  | NOT LESS THAN PREDETERMINED VALUE | LESS THAN PREDETERMINED VALUE |
| BATTERY VOLTAGE | NOT LESS THAN SECOND PREDETERMINED VOLTAGE (ex. Vm ≥ 4.15 V) | (A) HIGH DISCHARGE IN WHICH DISCHARGE UNIT IS TURNED ON REGARDLESS OF ILLUMINANCE (FIG. 4) (CHANGE TO TERMINAL a) | (D) DISCHARGE UNIT IS TURNED OFF (CHANGE TO TERMINAL c) |
| | NOT LESS THAN FIRST PREDETERMINED VOLTAGE AND LESS THAN SECOND PREDETERMINED VOLTAGE (ex. 3.8 V ≤ Vm < 4.15 V) | (B) DISCHARGE UNIT IS TURNED ON IN ACCORDANCE WITH ILLUMINANCE (FIG. 5) (CHANGE TO TERMINAL b) | (E) DISCHARGE UNIT IS TURNED OFF (CHANGE TO TERMINAL c) |
| | LESS THAN FIRST PREDETERMINED VOLTAGE (ex. Vm < 3.8 V) | (C) DISCHARGE UNIT IS TURNED OFF (CHANGE TO TERMINAL c) | (F) DISCHARGE UNIT IS TURNED OFF (CHANGE TO TERMINAL c) |

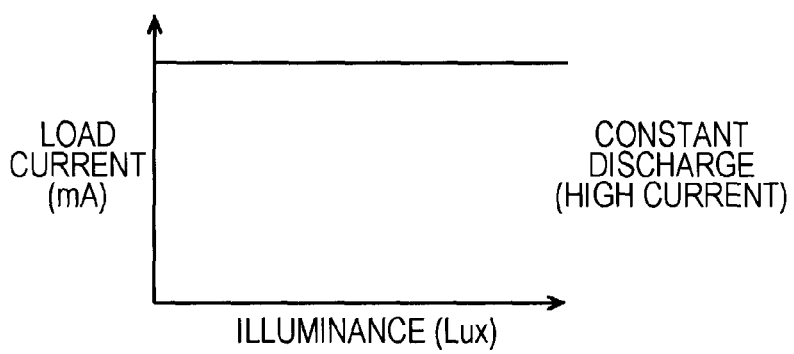
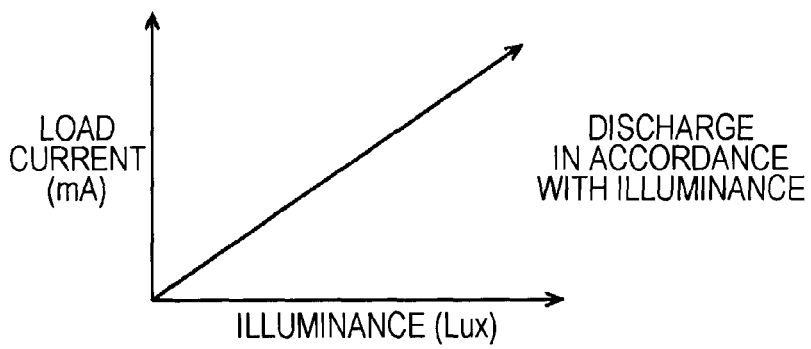
FIG. 6
| ILLUMINANCE [Lux] | ≥100 | ≥1000 | ≥10000 | ≥100000 |
|---|---|---|---|---|
| ENVIRONMENT | DINING ROOM/ TEA ROOM | OFFICE ROOM/ CONFERENCE ROOM<br>DESIGN TABLE | RAINY WEATHER<br>CLOUDY WEATHER | FINE WEATHER<br>CLEAR AND SUNNY |

FIG. 11

| | | BATTERY TEMPERATURE | | |
|---|---|---|---|---|
| | | NOT LESS THAN SECOND PREDETERMINED TEMPERATURE (ex. Tm ≥ 50 °C) | NOT LESS THAN FIRST PREDETERMINED TEMPERATURE AND LESS THAN SECOND PREDETERMINED TEMPERATURE (ex. 40 °C ≤ Tm < 50 °C) | LESS THAN FIRST PREDETERMINED TEMPERATURE (ex. Tm < 40 °C) |
| BATTERY VOLTAGE | NOT LESS THAN SECOND PREDETERMINED VOLTAGE (ex. Vm ≥ 4.15 V) | (a) HIGH DISCHARGE IN WHICH DISCHARGE UNIT IS TURNED ON REGARDLESS OF ILLUMINANCE (FIG. 4) (CHANGE TO TERMINAL a) | (g) DISCHARGE UNIT IS TURNED ON IN ACCORDANCE WITH ILLUMINANCE (FIG. 5) (CHANGE TO TERMINAL b) | (d) DISCHARGE UNIT IS TURNED OFF (CHANGE TO TERMINAL c) |
| | NOT LESS THAN FIRST PREDETERMINED VOLTAGE AND LESS THAN SECOND PREDETERMINED VOLTAGE (ex. 3.8 V ≤ Vm < 4.15 V) | (b) DISCHARGE UNIT IS TURNED ON IN ACCORDANCE WITH ILLUMINANCE (FIG. 5) (CHANGE TO TERMINAL b) | (h) DISCHARGE UNIT IS TURNED ON IN ACCORDANCE WITH ILLUMINANCE (FIG. 5) (CHANGE TO TERMINAL b) | (e) DISCHARGE UNIT IS TURNED OFF (CHANGE TO TERMINAL c) |
| | LESS THAN FIRST PREDETERMINED VOLTAGE (ex. Vm < 3.8 V) | (c) DISCHARGE UNIT IS TURNED OFF (CHANGE TO TERMINAL c) | (i) DISCHARGE UNIT IS TURNED OFF (CHANGE TO TERMINAL c) | (f) DISCHARGE UNIT IS TURNED OFF (CHANGE TO TERMINAL c) |

MOBILE TERMINAL, METHOD OF PROTECTING BATTERY, AND BATTERY PROTECTION PROGRAM

CROSS REFERENCE TO RELATED APPLICATIONS

This application is related to and claims priority under 35 U.S.C. §119(e) to Provisional Application Ser. No. 61/355,278, filed Jun. 17, 2010, the contents of which are hereby incorporated herein by reference.

BACKGROUND

1. Field

This specification relates to an apparatus supplied with driving power from a battery, for example, a mobile telephone terminal, etc., a method of protecting a battery used for the apparatus, and program.

2. Description of the Related Art

A mobile terminal, such as a mobile telephone terminal, etc., is driven by a battery. FIG. 13 illustrates an example of a configuration for charging a battery, by an AC adapter, for use as a driving power source of a mobile telephone terminal, for example.

A terminal function section 100 has a control section including a CPU, a wireless communication section, an operation section, a display section, a microphone, a speaker, etc. The terminal function section 100 is a part which functions as a mobile telephone terminal, and is supplied with driving power by a battery 11 to be driven.

As a charging circuit 20, a circuit including a protection circuit 21, a charge control IC (integrated circuit) 22, an FET (field-effect transistor) 23, a current detection resistor 24, a charge display LED (light-emitting diode) 25, and a current restriction resistor 26 is connected to the battery 11.

At charging time by the AC adapter 200, a charging current flows from the AC adapter 200 to the battery 11 through a protection circuit 21, an FET 23, and a current detection resistor 24 to charge the battery 11. The protection circuit 21 is a circuit which prevents a current from flowing from the battery 11 to the AC adapter 200.

In this manner, a battery is normally used in a mobile terminal (mobile electronic device), such as a mobile telephone terminal, for example. And there are various kinds of batteries, and the batteries have different operating temperature ranges and operating voltage ranges.

Referring to an operating temperature range, a lead-acid battery has a range of −10° C. to +40° C., a nickel-cadmium battery has a range of −20° C. to +45° C., a nickel-hydrogen battery has a range not exceeding +40° C., and a lithium-ion battery has a range of −10° C. to +40° C.

Also, referring to an operating voltage range, a lead-acid battery has a range of 1.8 V to 2.1 V, a nickel-cadmium battery has an operating voltage of 1.2 V, a nickel-hydrogen battery has a range of 1.1 V to 1.4 V, and a lithium-ion battery has a range of 3.0 V to 4.2 V.

A lithium-ion battery is used for various kinds of mobile terminals, such as a mobile telephone terminal as a battery having a relatively wide operating temperature range, having little current self-leakage, and being capable of supplying a relatively high driving voltage stably at use time.

In the case of the lithium-ion battery, if the battery is charged at a high temperature of 50° C. or more, deterioration of the battery becomes significant. However, the battery has a characteristic in which deterioration of the battery can be prevented by lowering the battery voltage to a predetermined level (for example, about 3.6 V).

In recent years, it is thought that a battery of a mobile terminal, such as a mobile telephone terminal, etc., is charged by a solar cell from the viewpoint of ecology, etc. Accordingly, it is thought that a mobile terminal is equipped with a solar cell, and the mobile terminal may be left on a sunny spot, etc.

Thus, Japanese Unexamined Patent Application Publication No. 7-250437 has disclosed an invention of a power-source unit in which if a charging voltage of a battery, which is a lithium-ion battery, reaches a first predetermined level (for example, 4V), the charging voltage is decreased to a second predetermined level (for example, 3.6 V).

In the invention disclosed in Japanese Unexamined Patent Application Publication No. 7-250437, discharging is performed in a highly-illuminated environment having a large output power from a solar cell. Accordingly, it can be expected that deterioration of a battery will be effectively restrained by applying the invention disclosed in Japanese Unexamined Patent Application Publication No. 7-250437 to various kinds of devices in which the battery is charged by a solar cell.

However, a temperature of a battery mounted on a terminal apparatus, such as a mobile telephone terminal, etc., increases not only in the case of a mobile terminal equipped with a solar cell. There are cases where a mobile terminal which is not equipped with a solar cell is left on a sunny spot near a window, etc. Thus, it is necessary to allow restraining the battery from deteriorating in various kinds of mobile terminals equipped with a battery regardless of a solar cell.

Also, in the case of the invention described in Japanese Unexamined Patent Application Publication No. 7-250437, if a charging voltage of the battery (charging battery) has reached a predetermined first level in a highly-illuminated environment having a large output power from a solar cell, discharge is carried out to a predetermined second level.

Accordingly, it is thought that even if the battery has not become high temperature, when the charging voltage becomes the first level, discharge is sometimes carried out. In this case, unnecessary discharge is carried out, and thus there is an increasing possibility that necessary power is not supplied from the battery at necessary time.

On the contrary, it is thought that there are cases where regardless of the battery having a high temperature, since the charging voltage of the charging battery has not become the first level, discharge is not carried out while the battery is kept to have a relatively high charging voltage. In this case, it is thought that there are cases where discharge is not carried out at adequate timing, and thus it is not possible to sufficiently restrain deterioration of the battery.

In view of the above points, it is desirable to reliably and adequately restrain deterioration of a battery which is mounted on various kinds of mobile terminal in order to supply driving power.

BRIEF SUMMARY

According to an embodiment, there is provided a mobile terminal apparatus including: a battery; a temperature detection section configured to detect a temperature of the battery; a voltage detection section configured to detect a battery voltage of the battery; a discharge section configured to discharge the battery; an illuminance detection section configured to detect an illuminance on the mobile terminal apparatus; and a control section configured to determine whether to gradually discharge the battery in accordance with the detected illuminance or to rapidly discharge the battery, wherein the determination is made on the basis of the temperature detected from the temperature detection section and the battery voltage detected from the voltage detection section, and to control the discharge section to discharge the battery in accordance with the determination.

According to another embodiment, there is provided method of protecting a battery, implemented on a mobile terminal apparatus having the battery, including: detecting, at a temperature detection section, a temperature of the battery; detecting, at a voltage detection section, a battery voltage of the battery; discharging, at a discharge section, the battery; detecting, at an illuminance detection section an illuminance on the mobile terminal apparatus; and determining, at a control section, whether to gradually discharge the battery in accordance with the detected illuminance or to rapidly discharge the battery, wherein the determination is made on the basis of the temperature detected from the temperature detection section and the battery voltage detected from the voltage detection section, and controlling the discharge section to discharge the battery in accordance with the determination.

According to another embodiment, there is provide, a computer readable storage medium encoded with computer executable instructions, which when executed by mobile terminal apparatus having a battery, cause the mobile terminal apparatus to perform a method of protecting the battery, including: detecting, at a temperature detection section, a temperature of the battery; detecting, at a voltage detection section, a battery voltage of the battery; discharging, at a discharge section, the battery; detecting, at an illuminance detection section an illuminance on the mobile terminal apparatus; and determining, at a control section, whether to gradually discharge the battery in accordance with the detected illuminance or to rapidly discharge the battery, wherein the determination is made on the basis of the temperature detected from the temperature detection section and the battery voltage detected from the voltage detection section, and controlling the discharge section to discharge the battery in accordance with the determination.

According to another embodiment, there is provided a mobile terminal apparatus comprising: a battery; a temperature detection means for detecting a temperature of the battery; a voltage detection means for detecting a battery voltage of the battery; a discharge means for discharging the battery; an illuminance detection means for detecting an illuminance on the mobile terminal apparatus; and a control means for determining whether to gradually discharge the battery in accordance with the detected illuminance or to rapidly discharge the battery, wherein the determination is made on the basis of the temperature detected from the temperature detection means and the battery voltage detected from the voltage detection means, and controlling the discharge means to discharge the battery in accordance with the determination.

By a mobile terminal according to an embodiment, the terminal apparatus includes a battery, and has a configuration capable of detecting a battery temperature of the battery through the temperature detection means, and detecting the battery voltage of the battery by the voltage detection means. Also, the terminal apparatus has a configuration capable of discharging by the discharge means, and detecting an illuminance of the mobile terminal by the illuminance detection means.

The control means identifies a case of controlling the discharge means in accordance with the illuminance detected by the illuminance detection means on the basis of the temperature of the battery from the temperature detection means and the voltage of the battery from the voltage detection means.

The control means controls the discharge means to discharge from the battery in accordance with the illuminance (detection output) from the illuminance detection means in the identified case.

In this manner, it is possible to discharge the battery at adequate timing determined in accordance with the battery temperature and the battery voltage of the battery in response to the illuminance, and thus it is possible to reliably and adequately restrain deterioration of the battery.

That is to say, it is possible to adequately control the battery voltage of the battery in accordance with the battery temperature and the rising trend thereof, to effectively prevent deterioration of the battery, and not to hinder the battery from supplying driving power.

By this embodiment, it is possible to reliably and adequately restrain a rapid deterioration phenomenon of a battery by gasification of electrolytic solution caused by thermal stress and voltage stress. Thereby, it is possible to increase a life span of a battery. Also, it is possible to adequately maintain the supply of driving power from the battery.

BRIEF DESCRIPTION OF THE DRAWINGS

FIG. 3 is a diagram for explaining processing performed by the battery protection section in accordance with a battery temperature and a battery voltage of a battery;

FIG. 4 is a diagram for explaining processing in the case where the battery is rapidly discharged by a discharge unit;

FIG. 5 is a diagram for explaining processing in the case where the battery is discharged in accordance with illuminance by the discharge unit;

FIG. 6 is a diagram illustrating a general relationship between illuminance and environment;

FIG. 11 is a diagram for explaining processing performed by the battery protection section in accordance with a battery temperature and a battery voltage of a battery in the third embodiment;

DETAILED DESCRIPTION

In the following, a description will be given of an embodiment with reference to the drawings. In the following, a description will be given of the case where an apparatus, method, and program according to an embodiment is applied to a mobile telephone terminal as an example.

[First Embodiment]

Example of configuration of mobile telephone terminal

Figure 1:
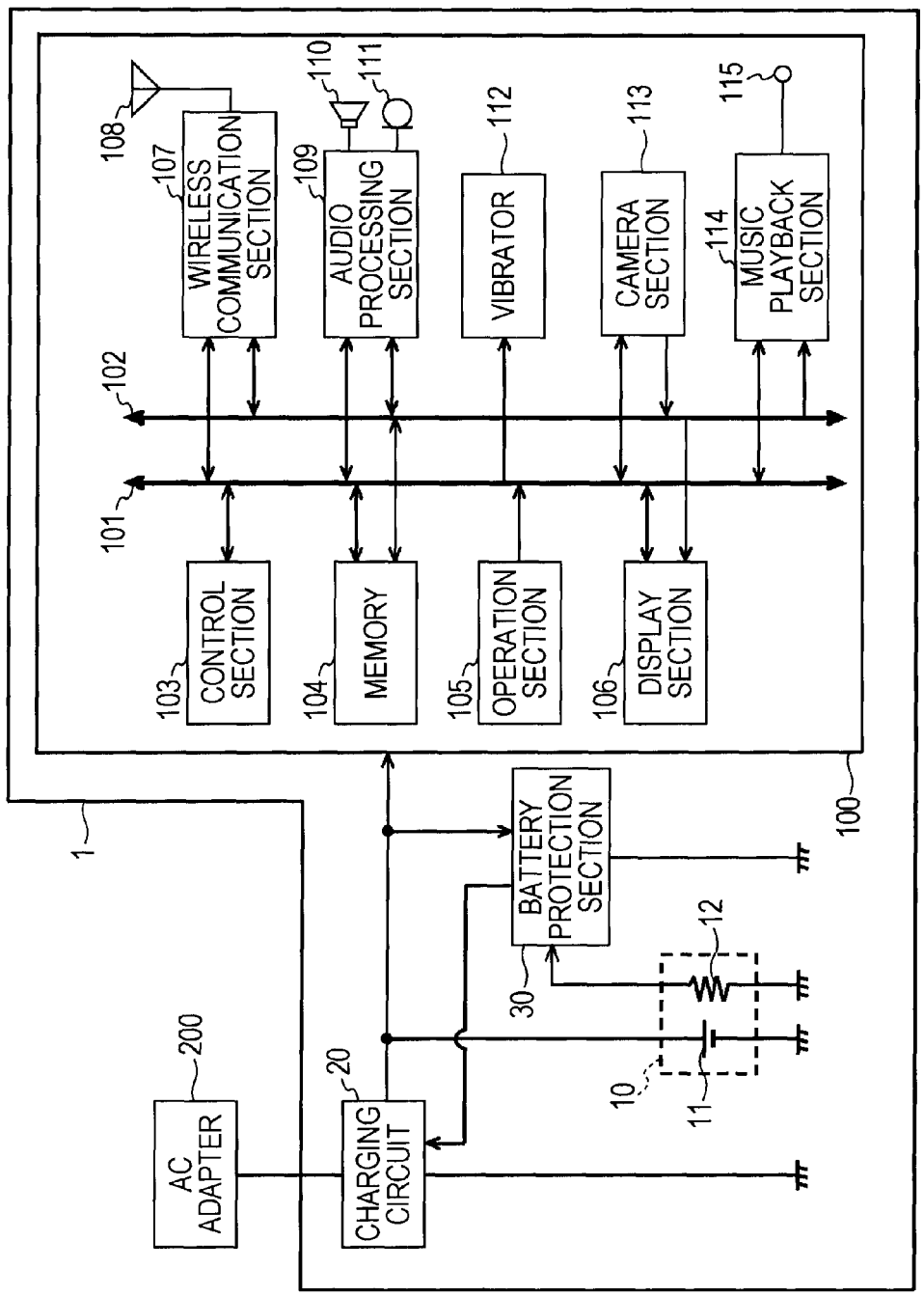
FIG. 1 is a block diagram for explaining an example of a configuration of a mobile telephone terminal according to a first embodiment.

FIG. 1 is a block diagram for explaining an example of a configuration of a mobile telephone terminal 1 according to a first embodiment.

As shown in FIG. 1, the mobile telephone terminal 1 according to the first embodiment includes a terminal function section 100, a battery section 10, a charging circuit 20, and a battery protection section 30. The terminal function section 100 is a section functioning as a telephone terminal. The battery section 10 works as a driving power source supplying power to the terminal function section 100.

The charging circuit 20 receives the supply of power through an external AC adapter 200, and charges the battery of the battery section 10. The battery protection section 30 restrains deterioration of the battery of the battery section 10. In the following, the individual sections will be described.

[Configuration and Basic Functions of Terminal Function section 100]

A description will be given of the terminal function section 100. As shown in FIG. 1, in the terminal function section 100, a control section 103, a memory 104, an operation section 105, a display section 106, a wireless communication section 107, an audio processing section 109, a vibrator 112, a camera section 113, and a music playback section 114 are connected to a system bus including a control bus 101 and a data bus 102.

An antenna 108 is connected to the wireless communication section 107, and a speaker 110 as a telephone receiver and a microphone 111 as a telephone transmitter are connected to the audio processing section 109. Also, an audio output terminal 115 is connected to the music playback section 114. For example, an earphone, etc., is connected to the audio output terminal 115, and, music (voice) in accordance with an audio signal played back by the music playback section 114 can be heard.

Although not shown in the figure, the control section 103 is a microcomputer in which a CPU (Central Processing Unit), a ROM (Read Only Memory), a RAM (Random Access Memory), etc., are connected through a CPU bus.

In the ROM of the control section 103, programs for executing various kinds of processing and controlling individual sections and necessary data for the processing are stored. The CPU of the control section 103 performs various kinds of processing in accordance with the programs, thereby controlling the individual sections of the terminal function section 100. In this regard, the RAM is used mainly for a working area for temporarily storing intermediate results of the processing in various kinds of processing, etc.

The memory 104 is a semiconductor memory, such as for example, a flash memory, etc., which stores image data, such as a moving image, a still image, etc., screen data, such as an operation screen, etc., music, audio data, telephone directory data, mail data, etc.

The operation section 105 includes various operation keys and operation dials, etc., such as a numeric keypad including 0 to 9 keys, various function keys, a dial to be rotated, a so-called jog dial capable of being rotated and pressed, or, a slide key, etc.

The display section 106 includes a so-called slim-type display element, such as an LCD (Liquid Crystal Display) having a relatively large display screen, an organic EL display (organic electroluminescence display), etc.

In this regard, a touch panel can be attached on a display screen of a display element, such as an LCD, etc., and an operation section as an input means can be configured using display information on the display screen of the display element and the touch panel.

The wireless communication section 107 receives a signal transmitted to the own terminal through the antenna 108, demodulates the signal, and separates the signal into audio data and control data, etc. The wireless communication section 107 supplies the audio data to the audio processing section 109, and the control data, etc., other than the audio data to the control section 103.

Also, the wireless communication section 107 performs modulation, etc., on data to be transmitted, such as audio data from the audio processing section 109 described later and control data from the control section 103, etc., to form a transmission signal, and transmits the signal through the antenna 108.

The audio processing section 109 performs D/A (Digital/Analog) conversion, etc., on digital audio data received through the wireless communication section 107 and demodulated to form an analog audio signal, and supplies the signal to the speaker 110 as a telephone receiver. Thereby, sound in accordance with the audio data received from the other end is output from the speaker 110.

Also, the audio processing section 109 performs A/D (Analog/Digital) conversion on an analog audio signal, which is produced by collecting sound through the microphone 111 and converting into an electronic signal, to form digital audio data, and supplies the data to the wireless communication section 107 to transmit the data to the other end.

In this manner, it is possible for the wireless communication section 107 and the audio processing section 109 in the terminal function section 100 to cooperate with each other to perform telephone conversation through a communication line connected to the other end of the communication.

In this regard, it is possible for the control section 103 to control the wireless communication section 107 to connect to the Internet, to access a target server, and to download necessary information, and to upload data from the own terminal.

Also, it is possible for the control section 103 to control the wireless communication section 107 to connect to the Internet to send and receive e-mails. That is to say, it is possible to transmit an e-mail created at the own terminal to an e-mail server of the other end, and to receive an e-mail sent to the own terminal from an e-mail server, etc.

The vibrator 112 generates vibration when the mobile telephone terminal 10 receives an incoming call, etc., in a silent mode. In this regard, although not shown in the figure, a ringer, etc., is also disposed in the terminal function section 100 of the mobile telephone terminal 10. Thus, it is possible to produce various kinds of incoming sound in a mode other than the silent mode.

The camera section 113 includes an imaging lens, an imaging device, such as a CCD (Charge Coupled Device) image sensor, a CMOS (Complementary Metal Oxide Semiconductor) image sensor, etc., and a camera-signal processing circuit, etc.

And the camera section 113 captures a moving image or a still image of a subject under the control of the control section 103, and obtains the image as digital image data. The digital image data obtained in this manner is supplied to the memory 104 through the data line 102, and is stored in the memory 104.

The music playback section 114 is controlled by the control section 103, receives the supply of music data selected from music data stored in the memory 104, performs compression/expansion processing, D/A conversion processing on the data, and forms and outputs an analog audio signal.

Thereby, it is possible to listen to music (voice) in accordance with music data played back by the music playback section 114 through an earphone, etc., connected to the audio output terminal 115.

In this regard, the memory 104 can store image data and music data, etc., obtained through the wireless communication section 107, and also can store image data and music data supplied through an external input terminal not shown in the figure.

And the image data stored in the memory 104 can be read under the control of the control section 103, and can be displayed on the display section 106 for use, etc. Also, as described above, the music data stored in the memory 104 is read by the control section 103, and played back using the function of the music playback section 114 for use.

In this manner, the terminal function section 100 can perform telephone communication and data communication, and can capture a moving image and a still image using the camera function, and store the image into the memory 104 to use the image. Further, the terminal function section 100 can play back music data stored in the memory 104 using the music playback function, and use the music data.

[Configurations of Battery Section 10 and Charging Unit 20]

A description will be given of the battery section 10 supplying driving power to the above-described terminal function section 100, and the charging unit 20 charging the battery section 10. As shown in FIG. 1, the battery section 10 includes the battery 11 and a thermistor 12.

The battery 11 is, for example, a lithium-ion battery having a high energy density, which is generally used for a battery of a mobile-telephone terminal and uses cobalt or graphite for the electrode thereof. The thermistor 12 is a resistive element having a large change in electric resistance with respect to a change in temperature. The thermistor 12 is disposed in the vicinity of battery 11, and serves to detect a battery temperature of the battery 11.

Figure 13:
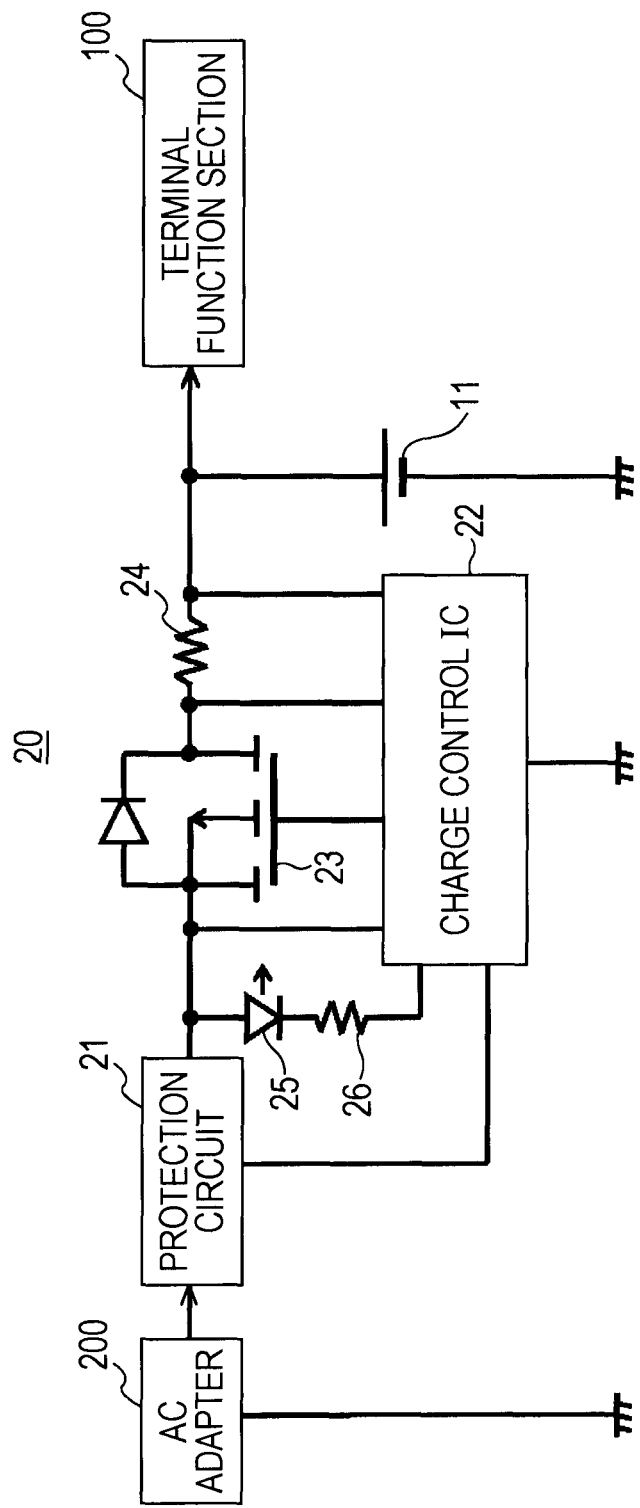
FIG. 13 is a block diagram for explaining an example of a related-art charging circuit.

The charging unit 20 receives power supply through the AC adapter 200, and charges the battery 11. The charging unit 20 is basically configured in the same manner as the charging circuit 20 described using FIG. 13.

[Configuration of Battery Protection Section 30]

A description will be given of the battery protection section 30. The battery protection section 30 identifies a case where discharge is unnecessary, a case where gradual discharge is necessary, and a case where rapid discharge is necessary on the basis of a battery temperature of the battery 11 and a battery voltage of the battery 11. And the battery protection section 30 discharges the battery 11 in accordance with the identified individual cases.

Specifically, (1) The battery protection section 30 determines whether it is unnecessary for the battery 11 to be discharged or it might become necessary to be discharged on the basis of the battery temperature of the battery 11.

(2) If determined that it might become necessary for the battery 11 to be discharged, the battery protection section 30 determines whether it is unnecessary for the battery 11 to be discharged or it is necessary to be discharged on the basis of the battery voltage of the battery 11.

(3) If determined that it is necessary for the battery to be discharged, the battery protection section 30 determines whether the battery ought to be gradually discharged in accordance with the current illuminance or it is necessary to carry out discharge rapidly on the basis of the battery voltage of the battery 11.

The battery protection section 30 controls the discharge of the battery 11 on the basis of the determination result.

Accordingly, as described below, the battery protection section 30 includes a path connected to the thermistor 12 of the battery section 10 for detecting the battery temperature, and a path connected to the battery 11 for detecting the battery voltage of the battery 11. Further, the battery protection section 30 includes a path for detecting illuminance (level of brightness) of the mobile telephone terminal 1 and a path for discharging the battery 11.

Figure 2:
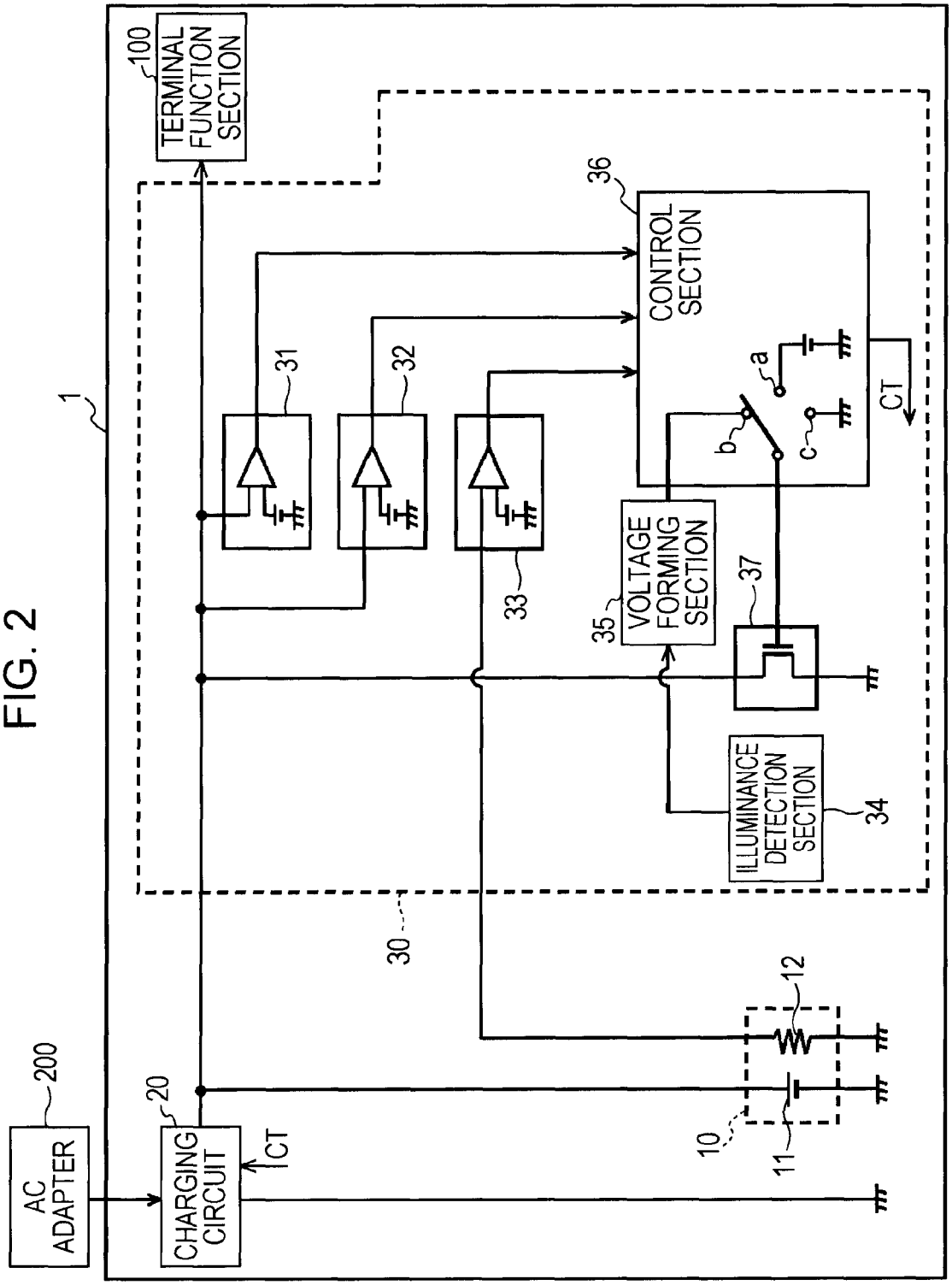
FIG. 2 is a block diagram for explaining an example of a specific configuration of a battery protection section.

A description will be given of a specific example of a configuration of the battery protection section 30. FIG. 2 is a block diagram for explaining an example of a specific configuration of the battery protection section 30. In a mobile telephone terminal 1 according to the first embodiment, the battery protection section 30 includes a first voltage detection section 31, a second voltage detection section 32, a temperature detection section 33, an illuminance detection section 34, a voltage forming section 35, a control section 36, and a discharge unit 37.

The first voltage detection section 31 outputs a signal which becomes a low level if the battery voltage is less than a first predetermined voltage value, and outputs a signal which becomes a high level if the battery voltage is not less than the first predetermined voltage value. And as described above, the operating voltage range of the battery 11, which is a lithium-ion battery, is from 3.0V to 4.2V, and the first predetermined voltage value is about 3.8 V, for example.

And in the case of the example shown in FIG. 2, the first voltage detection section 31 is shown to have a reference power source supplying the first predetermined voltage value and a comparator which compares the battery voltage with the first predetermined voltage value from the reference power source. In this regard, the first voltage detection section 31 can have various configurations, for example, a configuration in which a first predetermined voltage value formed by dividing a predetermined voltage using a resistor, etc., is supplied to a comparator, etc.

The second voltage detection section 32 outputs a signal which becomes a low level if the battery voltage is less than a second predetermined voltage value, and outputs a signal which becomes a high level if the battery voltage is not less than the second predetermined voltage value. In this regard, the second predetermined voltage value is, for example, about 4.15 V, which is higher than the first predetermined voltage value.

And in the case of the example shown in FIG. 2, the second voltage detection section 32 is shown to have a reference power source supplying the second predetermined voltage value and a comparator which compares the battery voltage with the second predetermined voltage value from the reference power source.

In this regard, in the same manner as above-described first voltage detection section 31, the second voltage detection section 32 can also have various configurations, for example, a configuration in which a second predetermined voltage value formed by dividing a predetermined voltage using a resistor, etc., is supplied to a comparator, etc., in place of the reference power source.

The temperature detection section 33 outputs a signal which becomes a low level if a voltage in accordance with the detection output from the thermistor 12 is less than a voltage corresponding to the predetermined temperature value, and outputs a signal which becomes a high level if the voltage is not less than the voltage corresponding to the predetermined temperature value. Here, the predetermined temperature value is about, for example, about 60° C., at which deterioration of the battery becomes significant when the battery voltage is 4.15 V or more.

And in the case of the example shown in FIG. 2, the temperature detection section 33 is shown to have a reference power source supplying the voltage corresponding to the predetermined temperature value and a comparator which compares the voltage in accordance with the detection output from the thermistor 12 with the predetermined temperature value from the reference power source.

In this regard, the temperature detection section 33 can also have various configurations, for example, a configuration in which a voltage corresponding to the predetermined temperature value formed by dividing a predetermined voltage using a resistor, etc., is supplied to a comparator, etc., in place of the reference power source.

The illuminance detection section 34 includes a photodiode, a phototransistor, etc., and forms a current in accordance with the illuminance, and supplies the current to the voltage forming section 35. The voltage forming section 35 converts an output signal (current) from the illuminance detection section 34 into a voltage corresponding to the output signal, and supplies the voltage to the control section 36.

The control section 36 on/off-controls the charging circuit 20, and controls a switch circuit conceptually formed in the control section 36 in FIG. 2 in order to control the discharge unit 37 to discharge the battery 11.

As shown in FIG. 2, the discharge unit 37 includes an FET (Field effect transistor) connected to the battery 11. And in the discharge unit 37, the gate voltage is controlled by the control section 36 so that a current flowing through source-drain terminals is controlled, and thereby allowing discharging from the battery 11 in an adequate manner.

That is to say, although not shown in the figure, the control section 36 is a microcomputer illustrating a CPU, a ROM, and a RAM, and conceptually includes a switch circuit having three input terminals a, b, and c as shown in FIG. 2.

And as shown in FIG. 2, a relatively high predetermined voltage for rapidly discharging from the battery 11 is supplied to an input terminal a. The voltage in accordance with the detection from the illuminance detection section 34, formed by the voltage forming section 35, is supplied to an input terminal b. A terminal c is connected to ground in order to make the discharge unit 37 inactive.

And the control section 36 controls to change the switch circuit in the control section 36 to any one of the input terminals a, b, and c on the basis of the detection output of the temperature detection section 33 and the detection outputs from the first and the second voltage detection sections 31 and 32.

[Processing of Battery Protection Section 30]

A specific description will be given of the processing performed by the battery protection section 30. FIG. 3 is a diagram for explaining processing performed by the battery protection section 30 in accordance with a battery temperature and a battery voltage of the battery 11. Also, FIGS. 4 and 5 are diagrams for explaining processing in the case where the battery 11 is discharged by the discharge unit 37. FIG. 6 is a diagram illustrating a general relationship between illuminance and environment.

The control section 36 of the battery protection section 30 is monitoring the detection output from the temperature detection section 33. And the control section 36 determines that the battery 11 is not necessary to be discharged if the detection output from the temperature detection section 33 is the low level, and the battery temperature of the battery 11 is less than a predetermined value (less than 60° C.). Because the battery 11 is not in a state of deterioration on the basis of the state of the battery temperature.

In this case, as shown by individual fields (D), (E), and (F) on the right side in FIG. 3, the control section 36 turns off the discharge unit 37 regardless of the battery voltage of the battery 11. Specifically, the control section 36 changes the switch circuit in the control section 36 to select the input terminal c in order not to supply a voltage to the gate terminal of the discharge unit 37, turning off the discharge unit 37. In this case, discharging is not carried out from the battery 11, and if the battery 11 is being charged, the charging is continued.

Also, the control section 36 determines that the battery 11 is necessary to be discharged if the detection output from the temperature detection section 33 is the high level, and the battery temperature of the battery 11 is not less than a predetermined value (not less than 60° C.). In this case, the control section 36 further refers to the detection outputs from the first and the second voltage detection sections 31 and 32.

And it is assumed that the detection output from the second voltage detection section 32 is also the high level, and the battery voltage Vm of the battery 11 is not less than the second predetermined voltage value (not less than 4.15 V). That is to say, it is assumed that the battery temperature of the battery 11 is not less than the predetermined value (not less than 60° C.), and the battery voltage Vm of the battery 11 is not less than the second predetermined voltage value (not less than 4.15 V).

In that state, the battery 11 deteriorates rapidly. Accordingly, as shown in (A) field in FIG. 3, the control section 36 changes the switch circuit in the control section 36 to select the input terminal a.

Thereby, a relatively high constant voltage is supplied to the gate terminal of the discharge unit 37, and thus a constant current flows through the discharge unit 37 irrelevantly of illuminance in a manner shown in FIG. 4. In this case, high discharge is carried out from the battery 11, thereby rapidly preventing the battery 11 from deteriorating.

In this regard, at the time of discharging from the battery 11, the control section 36 controls the charging circuit 20 not to charge the battery 11. Thereby, the battery 11 is controlled not to carry out discharging and charging, which are contradictory to each other, at the same time.

Also, it is assumed that the detection output from the temperature detection section 33 is the high level, and the battery temperature of the battery 11 is not less than the predetermined value (not less than 60° C.), but the detection output of the first voltage detection section 31 is the high level, and the detection output of the second voltage detection section 32 is the low level.

That is to say, it is assumed that the battery temperature of the battery 11 is not less than the predetermined value (not less than 60° C.), and the battery voltage Vm of the battery 11 is not less than the first predetermined voltage value (not less than 3.8 V) and less than the second predetermined voltage value (less than 4.15 V).

In this case, the battery 11 is not in the state of rapidly deteriorating, but if the battery temperature is maintained or increases, the battery voltage is maintained, or increases, the possibility of the battery 11 deteriorating becomes high. Accordingly, as shown in (B) field in FIG. 3, the control section 36 changes the switch circuit in the control section 36 to select the input terminal b.

Thereby, a voltage in accordance with the current illuminance detected by the illuminance detection section 34 is supplied to the gate terminal of the discharge unit 37 through the voltage forming section 35, and as shown in FIG. 5, a current in accordance with the illuminance flows through the discharge circuit section 37. That is to say, discharging from the battery 11 is carried out in accordance with illuminance.

That is to say, as shown in FIG. 6, even if the mobile telephone terminal 1 is left under the circumstances having a illuminance of 100 to 10000 lux, such as a dining room, a tea room, an office room, a conference room, a design table, rainy weather, etc., the battery 11 of the mobile telephone terminal 1 will not rapidly become high temperature.

However, if the mobile telephone terminal 1 is left under the circumstances having a illuminance of 100000 lux or more, such as in the case of fine weather or clear and sunny weather, etc., the battery 11 of the mobile telephone terminal 1 may rapidly become high temperature. In this case, if the battery voltage is not less than the first predetermined voltage value, for example, is not less than 3.8 V, the battery 11 is apt to go into a state of rapidly deteriorating.

Accordingly, if the illuminance of the mobile telephone terminal 1 is not so high, and the temperature of the battery 11 does not rapidly increase, the degree of discharging from the battery 11 is kept relatively low in accordance with the illuminance in order that the discharge is not carried out more than necessary.

On the other hand, if the illuminance of the mobile telephone terminal 1 is high, and the temperature of the battery 11 rapidly increases, the degree of discharging from the battery 11 is set to relatively high in accordance with illuminance, and the deterioration of the battery 11 is effectively prevented.

In this manner, when the temperature of the battery 11 is not less than the predetermined temperature value, and the battery voltage of the battery 11 is within a predetermined range, the battery 11 is not in the state of deteriorating quickly, but may change into a state of rapidly deteriorating depending on an increase in the battery temperature.

Accordingly, under the circumstances, the battery 11 is discharged within a minimum necessary range in accordance with the illuminance detected in real time. Thereby, it is possible to adequately control the battery voltage of the battery 11, and to reliably prevent the deterioration of the battery 11.

In this regard, as described above, at the time of discharging from the battery 11, the control section 36 controls the charging circuit 20 not to charge the battery 11. Thereby, the battery 11 is controlled not to carry out discharging and charging, which are contradictory to each other, at the same time.

Also, it is assumed that the detection output from the temperature detection section 33 is the high level, and the detection output from the first voltage detection section 31 is the low level. That is to say, it is assumed that the battery temperature of the battery 11 from the temperature detection section 33 is not less than the predetermined value (not less than 60° C.), and the battery voltage Vm of the battery 11 is not higher than the first predetermined voltage value (not higher than 3.8 V). In this case, the battery 11 is not in the state of rapidly deteriorating.

In this case, as shown by (C) field in FIG. 3, the control section 36 turns off the discharge unit 37 regardless of the battery voltage of the battery 11. That is to say, the control section 36 changes the switch circuit in the control section 36 to select the input terminal c in order not to supply voltage to the gate terminal of the discharge unit 37, turning off the discharge unit 37.

Thereby, discharging is not carried out from the battery 11, and if the battery 11 is being charged, the charging is continued. In this manner, even when the battery temperature of the battery 11 is not less than the predetermined temperature value, if the battery voltage of the battery 11 is not higher than the first predetermined voltage value, unnecessary discharge of the battery 11 is not carried out.

In this regard, the control section 36 is monitoring the detection output from the temperature detection section 33 and the detection outputs of the first and the second voltage detection sections 31 and 32 all the time. As described above, it is possible to control the discharge unit 37 to discharge from the battery 11 in accordance with the state of the battery temperature and the battery voltage, and to stop the discharge from the battery 11. That is to say, it is possible to adequately control the battery voltage of the battery 11 in accordance with the battery temperature and the battery voltage of the battery all the time.

[Summary of Processing of Battery Protection Section 30]

Figure 7:
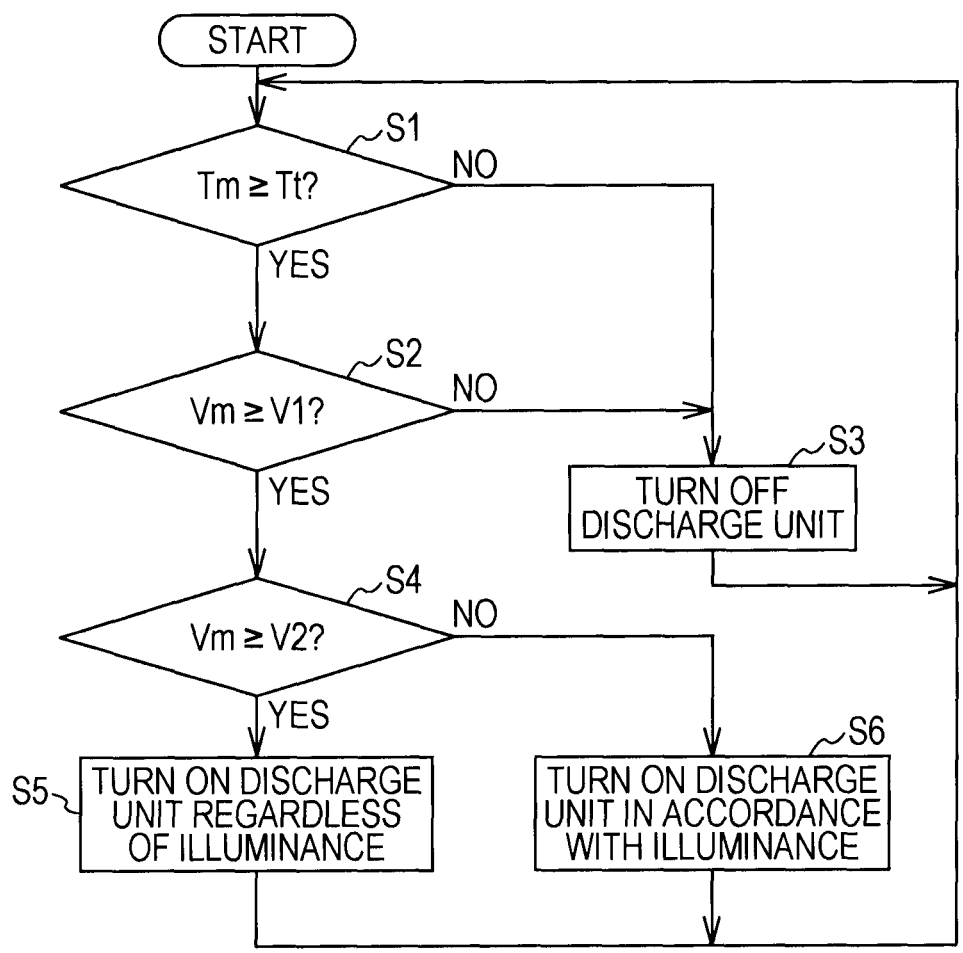
FIG. 7 is a flowchart for explaining processing performed mainly in a control section of the battery protection section of the mobile telephone terminal according to the first embodiment.

Next, a summary will be given of the processing performed by the battery protection section 30 of the mobile telephone terminal 1 according to the first embodiment with reference to a flowchart in FIG. 7. FIG. 7 is the flowchart for explaining processing performed mainly in the control section 36 of the battery protection section 30 of the mobile telephone terminal 1 according to the first embodiment.

The processing shown in FIG. 7 is processing for protecting the battery 11. Thus, as described later, the processing shown in FIG. 7 may be performed in the case where the conditions, such as a battery temperature, illuminance, etc., satisfy predetermined conditions.

However, here, a description will be given on the assumption that the processing shown in FIG. 7 is performed mainly by the control section 36 all the time when the battery 11 is connected to the mobile telephone terminal 1 in order to ensure protection against deterioration of the battery 11.

In this regard, in the flowchart shown in FIG. 7, a reference letter Tm denotes a battery temperature of the battery 11, and a reference letter Vm denotes a battery voltage of the battery 11. A reference letter Tt denotes a predetermined temperature value determined in advance, and is, for example, 60° C. as described above.

Also, a reference letter V1 denotes the first predetermined voltage value determined in advance, and for example, is 3.8 V. A reference letter V2 denotes a second predetermined voltage value determined in advance, and for example, is 4.15 V. That is to say, it is determined that the first predetermined voltage value V1<the second predetermined voltage value V2.

And when the battery 11 is connected to the mobile telephone terminal 1, the control section 36 executes the processing shown in FIG. 7. First, the control section 36 determines whether the battery temperature Tm of the battery 11 detected by the temperature detection section 33 is not less than the predetermined temperature value Tt on the basis of the output value from the thermistor 12 (step S1). The determination processing in step S1 is processing which determines whether the detection output from the temperature detection section 33 is the high level or not.

In the determination processing in step S1, if determined that the battery temperature Tm is not less than the predetermined temperature value Tt, it might be necessary to discharge the battery 11. Thus, the control section 36 further determines whether the battery voltage Vm of the battery 11 is not less than the first predetermined voltage value V1 (step S2). The determination processing in step S2 is processing which determines whether the detection output from the first voltage detection section 31 is the high level or not.

And, as shown in FIG. 7, in the determination processing in step S1, if determined that the battery temperature Tm is less than the predetermined temperature value Tt, the discharge unit 37 is turned off (step S3). In the same manner, in the determination processing in step S2, if determined that the battery voltage Vm of the battery 11 is less than the first predetermined voltage value V1, the discharge unit 37 is turned off (step S3).

In step S3, the control section 36 performs processing shown in the above-described individual fields (C), (D), (E), and (F) in FIG. 3. Specifically, in step S3, the control section 36 changes the switch circuit of the control section 36 to the input terminal c so as not to supply a voltage to the base terminal of the discharge unit 37, turning off the discharge unit 37. Thereby, the discharge from the battery 11 is not carried out by the discharge unit 37.

Also, in the determination processing in step S2, if determined that the battery voltage Vm of the battery 11 is not less than the first predetermined voltage value V1, the control section 36 further determines whether the battery voltage Vm of the battery 11 is not less than the second predetermined voltage value V2 or not (step S4). The determination processing in step S4 is processing which determines whether the detection output from the second voltage detection section 32 is the high level or not.

In the determination processing in step S4, if determined that the battery voltage Vm of the battery 11 is not less than the second predetermined voltage value V2, since the battery temperature Tm is not less than the predetermined temperature value Tt, the battery 11 is determined to be in a state of deteriorating rapidly.

In this case, the control section 36 turns on the discharge unit 37 irrelevantly of illuminance to carry out high discharge from the battery 11 (step S5). That is to say, in step S5, the processing shown in (A) field in FIG. 3 is performed. Specifically, in step S5, the control section 36 changes the switch circuit of the control section 36 to select the input terminal a.

Thereby, a relatively high constant voltage is supplied to the gate terminal of the discharge unit 37, and thus a constant current is allowed to flow through the source-drain terminals of the discharge unit 37 irrelevantly of illuminance as shown in FIG. 4, carrying out high discharge from the battery 11. Thereby, it is possible to restrain the deterioration of the battery 11.

Also, in the determination processing in step S4, if determined that the battery voltage Vm of the battery 11 is less than the second predetermined voltage value V2, it is understood that the battery temperature Tm is not less than the predetermined temperature value Tt, and the battery voltage Vm is not less than the first predetermined value V1 and less than the second predetermined value V2.

In this case, the control section 36 turns on the discharge unit 37 in accordance with the illuminance, and discharges from the battery 11 in accordance with the illuminance (step S6). That is to say, in step S6, the processing shown in (B) field in FIG. 3 is performed. Specifically, in step S6, the control section 36 changes the switch circuit of the control section 36 to select the input terminal b.

Thereby, a voltage in accordance with the illuminance detected by the illuminance detection section 34 is supplied from the voltage forming section 35 to the gate terminal of the discharge unit 37, and as shown in FIG. 5, a current in accordance with the illuminance flows through the source-drain terminals of the discharge unit 37.

Accordingly, a minimum necessary amount of discharge is carried out from the battery 11, and rapid deterioration of the battery 11 is prevented, thereby adequately allowing protecting the battery 11 from deterioration.

And after the processing in step S3, or step S5, or step S6, the processing from step S1 shown in FIG. 7 is repeated. Thereby, even when the discharge from the battery 11 is carried out by the processing in step S5 or step S6, if the battery temperature of the battery 11 drops less than the predetermined temperature value Tt, the discharge from the battery 11 is stopped.

In the same manner, even when the discharge from the battery 11 is carried out by the processing in step S5 or step S6, if the battery voltage of the battery 11 drops less than the first predetermined voltage value V1, the discharge from the battery 11 is stopped.

Also, when high discharge from the battery 11 is carried out by the processing in step S6, if the battery voltage of the battery 11 is not less than the first predetermined voltage value V1, but less than the second predetermined voltage value, the discharge from the battery 11 is carried out in accordance with the illuminance by the processing in step S5.

In this manner, in the mobile telephone terminal 1 according to the first embodiment, if the battery temperature of the battery 11 becomes the predetermined temperature value Tt or more, a determination is made on whether it is necessary to rapidly discharge from the battery 11 in accordance with the battery voltage of the battery 11.

And if it is not necessary to rapidly discharge, the discharge from the battery 11 is carried out in consideration of the illuminance of the mobile telephone terminal 1. Thereby, it is possible to carry out a minimum necessary amount of discharge from the battery 11 in accordance with the possibility (danger) of an increase in the battery temperature of the battery 11, and thereby to effectively prevent the deterioration of the battery 11.

Also, it is possible to limit the cases of rapidly discharging, and to reduce the cases of discharging from the battery 11 with a large current all at once. Thus, it is possible to reduce the cases where the discharge unit 37 generates heat, and gives thermal load to the charging battery to the utmost. That is to say, it is possible to reduce the cases where the discharge from the battery 11 gives thermal stress on the battery.

In this regard, it is possible not to perform the processing shown in FIG. 7, for example, if the battery temperature is less than a minimum reference temperature determined in advance, at night, etc., when the illuminance is very low. In addition, it is possible not to perform the processing shown in FIG. 7 if the battery temperature is not higher than the minimum reference temperature, and the illuminance is not higher than a minimum reference illuminance determined in advance.

Also, it is possible not to perform the processing shown in FIG. 7 if the battery voltage is not higher than a minimum reference voltage determined in advance. That is to say, it is possible to determine conditions for executing the processing shown in FIG. 7 or the conditions for not executing the processing in advance, and to control execution/non-execution of the processing shown in FIG. 7 depending on the conditions.

[Second Embodiment]

Next, a description will be given of a second embodiment. A mobile telephone terminal 1A according to the second embodiment described below includes a charging path from a solar cell in addition to a path from an external power source (AC adapter) as paths for charging a battery 11.

A mobile telephone terminal is carried about for use, and is used on the assumption that a mounted battery has been properly charged. However, depending on a use state of the mobile telephone terminal, situations might arise where the battery voltage drops at a place where one has gone, that is to say, the battery might run down.

Accordingly, there has been provided a mobile telephone terminal which is equipped with a solar cell and is capable of charging a battery through the solar cell in order for the battery being easily charged at an outdoor place, etc., for example.

It is common knowledge that a solar cell directly converts light energy into electric power using photovoltaic effect. In the case of a mobile telephone terminal equipped with a solar cell, a user who tries to efficiently charge a battery tends to leave the mobile telephone terminal in a sunny place.

In this case, there is a high possibility that the temperature of the battery included in a mobile telephone terminal rises. And, as described above, if the battery is in a state having a high temperature and a high battery voltage, the battery rapidly deteriorates.

Accordingly, in a mobile telephone terminal equipped with a solar cell, this device, which adequately controls discharge of the battery on the basis of the battery temperature and the battery voltage of the battery, gives an effective means for reliably protecting the battery.

Figure 8:
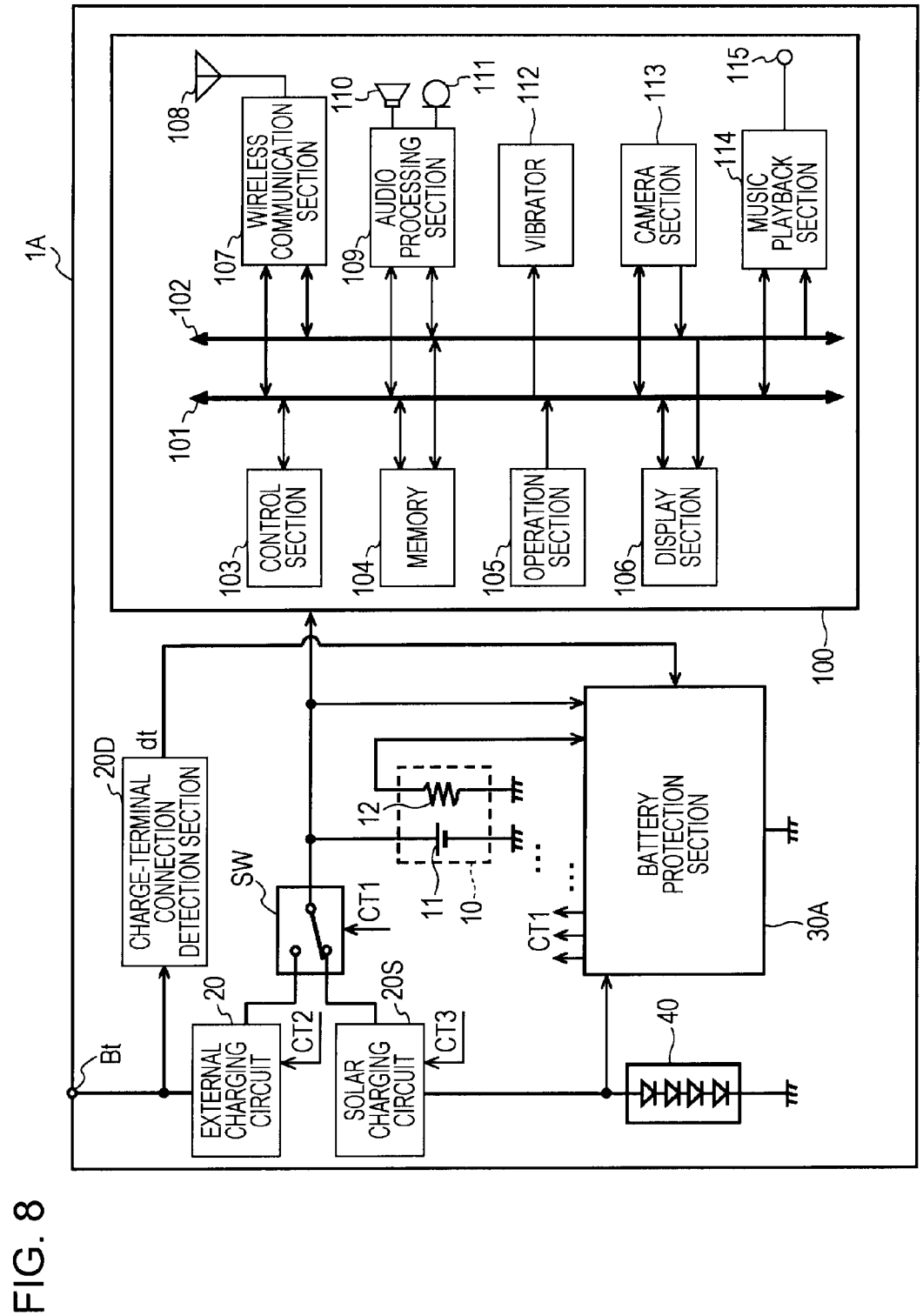
FIG. 8 is a block diagram for explaining a mobile telephone terminal according to a second embodiment.

FIG. 8 is a block diagram for explaining the mobile telephone terminal 1A according to the second embodiment. In the mobile telephone terminal 1A according to the second embodiment, shown in FIG. 8, similarly configured parts as those of the mobile telephone terminal 1 according to the first embodiment, shown in FIG. 1, are denoted by similar reference numerals, and the detailed description thereof will be omitted in order to avoid duplication.

As shown in FIG. 8, the mobile telephone terminal 1A according to the second embodiment includes a terminal function section 100, a battery section 10, an external charging circuit 20, a solar charging circuit 20S, a switch circuit SW, a charging-terminal-connection detection section 20D, a battery protection section 30A, and a solar cell 40.

The terminal function section 100, the battery section 10, and the external charging circuit 20 are configured in the same manner as the corresponding parts of the mobile telephone terminal 1 according to the first embodiment, shown in FIG. 1. In this case, the solar cell 40 constitutes a means other than an AC adapter, which supplies charging power to the battery 11.

As shown in FIG. 8, output power from the solar cell 40 is supplied to the solar charging circuit 20S. Although not shown in the figure, the solar charging circuit 20S includes, for example, a voltage conversion section performing voltage conversion on the output of the solar cell 40, and a charging circuit having a configuration shown in FIG. 13.

A solar cell has a large change in output power, for example, the output power becomes large when the weather is fine, and the output power becomes small when the weather is cloudy or rainy. Accordingly, it is difficult to efficiently charge the battery 11 without change.

Then, in the solar charging circuit 20S, the voltage conversion section raises the output from the solar cell 40 to, for example, about 4.0 V to 4.2 V, and supplies this voltage to the charging circuit, allowing the charging of the battery 11.

And, as shown in FIG. 8, the output from the external charging circuit 20 is supplied to one input terminal of the switch circuit SW, and the output of the solar charging circuit S is supplied to the other input terminal of the switch circuit SW.

The switch circuit SW is switched by a control signal CT1 from the control section 36A included in a battery protection section 30A described later in detail using FIG. 9. The control signal CT1 is formed on a detection output dt from the charging-terminal-connection detection section 20D.

Also, operation of the external charging circuit 20 is controlled by a control signal CT2 from the control section 36A of the battery protection section 30. Operation of the solar charging circuit 20S is controlled by a control signal CT3 from the control section 36A of the battery protection section 30A. A detailed description will be given of the ways of control later.

Thereby, in the case of the mobile telephone terminal 1A according to the second embodiment, it is possible to adequately switch between the case of charging from the outside through the AC adapter, and the case of charging through the solar cell 40, thereby allowing the battery 11 to be effectively charged.

And in the same manner as the case of the mobile telephone terminal 1 according to the above-described first embodiment, in the mobile telephone terminal 1A according to the second embodiment, it is possible to effectively protect deterioration of the battery 11 by the function of the battery protection section 30A.

That is to say, in the mobile telephone terminal 1A according to the second embodiment, it is also possible to distinguish and detect between the case where the battery 11 deteriorates rapidly and the case where the battery 11 might deteriorate in accordance with the battery temperature of the battery 11 and the battery voltage of the battery 11. And it is possible to adequately control the discharge from the battery 11 on the basis of the detection result.

Next, a description will be given of an example of a specific configuration of the battery protection section 30A of the mobile telephone terminal 1A according to the second embodiment. FIG. 9 is a block diagram for explaining an example of a specific configuration of the battery protection section 30A according to the second embodiment. In FIG. 9, similarly configured parts as those of the battery protection section 30 according to the first embodiment, shown in FIG. 2, are denoted by similar reference numerals, and the detailed description thereof will be omitted in order to avoid duplication.

Figure 9:
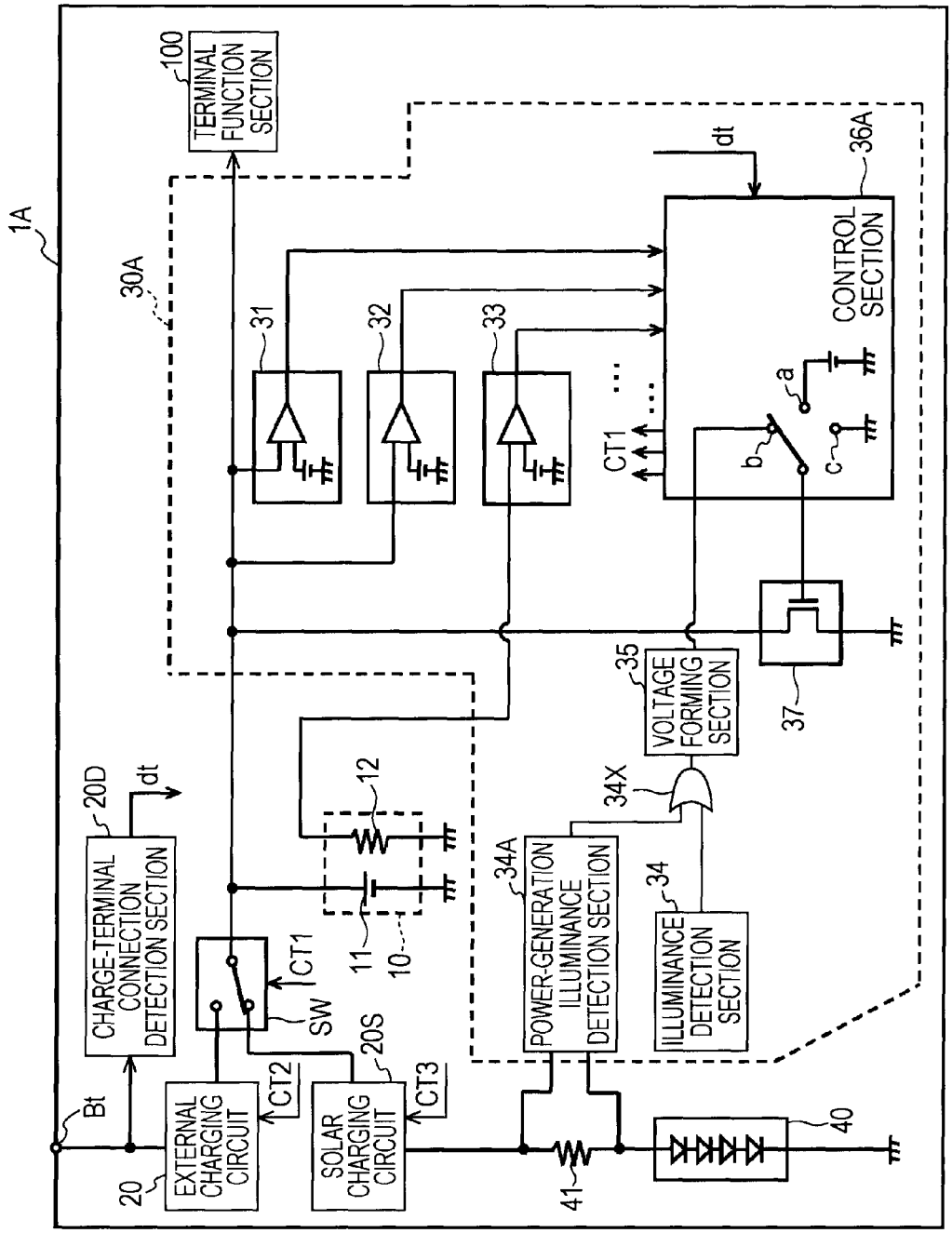
FIG. 9 is a block diagram for explaining an example of a configuration of a battery protection section.

As shown in FIG. 9, the battery protection section 30A according to the second embodiment includes a first voltage detection section 31, a second voltage detection section 32, a temperature detection section 33, a power-generation illuminance detection section 34A, an illuminance detection section 34, an OR circuit 34X, a voltage forming section 35, a control section 36A, and a discharge unit 37.

The first voltage detection section 31, the second voltage detection section 32, the temperature detection section 33, the illuminance detection section 34, the voltage forming section 35, and the discharge unit 37 are configured in the same manner as the corresponding individual parts of the battery protection section 30 according to the first embodiment, shown in FIG. 2.

And, as shown in FIG. 9, the power-generation illuminance detection section 34A is connected across both ends of the resistor 41 disposed between the solar cell 40 and the solar charging circuit 20S, and outputs a current in accordance with the illuminance of the mobile telephone terminal 1A on the basis of an output current from the solar cell 40.

That is to say, the solar cell 40 generates power in accordance with an illuminance, and thus it is possible to detect the illuminance of the mobile telephone terminal 1A on the basis of the output current from the solar cell 40.

And, as described above, the illuminance detection section 34 is configured in the same manner as the case of the mobile telephone terminal 1 according to the first embodiment, and is disposed on a surface different from a surface on which a light receiving surface of the solar cell 40 is disposed on the mobile telephone terminal 1A.

That is to say, the power-generation illuminance detection section 34A detects the illuminance of the mobile telephone terminal 1A in the case where the light receiving surface of the solar cell 40 is exposed so as to allow receiving light from the environment. On the other hand, the illuminance detection section 30 is disposed at a position allowing the detection of the illuminance of the mobile telephone terminal 1A in a state in which the light receiving surface of the solar cell 40 is not exposed.

And, as shown in FIG. 9, the illuminance detection output from the power-generation illuminance detection section 34A and the illuminance detection output from the illuminance detection output section 34 are supplied to the voltage forming section 35 through the OR circuit 34X.

The OR circuit 34X supplies a detection output having a higher level out of the illuminance detection output from the power-generation illuminance detection section 34A and the illuminance detection output from the illuminance detection output section 34 to the voltage forming section 35. Thereby, the detection output from the detection section detecting more adequately out of the power-generation illuminance detection section 34A and the illuminance detection section 34 is supplied to the voltage forming section 35, forming a voltage in accordance with the adequate illuminance and allowing supplying the voltage to an input terminal b of the switch circuit of the control section 36A.

And the control section 36A basically has a same function as that of the control section 36 of the battery protection section 30 according to the first embodiment, shown in FIG. 2. However, as described above, the control section 36A according to the second embodiment performs switching control of the switch circuit SW and active/inactive control of the external charging circuit 20 and the solar charging circuit 20S on the basis of the detection output dt of the charging-terminal-connection detection section 20D.

That is to say, the charging-terminal-connection detection section 20D forms the detection signal dt, which becomes a high level when the AC adapter is connected to a charge terminal Bt and a charging current is supplied to the external charging circuit 20, and becomes a low level when a charging current is not supplied to the external charging circuit 20.

And if the detection signal dt from the charging-terminal-connection detection section 20D is the high level, and the charging current is supplied through the charge terminal Bt, the control section 36A controls the individual sections as follows.

In this case, the control section 36A of the battery protection section 30A changes the switch circuit SW to the external charging circuit 20 by the control signal CT1. At the same time, the control section 36A activates the external charging circuit 20 by the control signal CT2, and stops the solar charging circuit 20S by the control signal CT3. Thereby, the battery 11 is charged through the external charging circuit 20 by the external charging current.

On the other hand, if the detection signal dt from the charging-terminal-connection detection section 20D is the low level, and the charging current is not supplied to the external charging circuit 20 through the charge terminal Bt, the control section 36A controls the individual sections as follows.

In this case, the control section 36A of the battery protection section 30A changes the switch circuit SW to the solar charging circuit 20S by the control signal CT1. At the same time, the control section 36A stops the external charging circuit 20 by the control signal CT2, and activates the solar charging circuit 20S by the control signal CT3. Thereby, the battery 11 is charged through the solar charging circuit 20S by the charging current from the solar cell 40.

In this manner, the control section 36A of the battery protection section 30A controls the switch circuit SW, the external charging circuit 20, and the solar charging circuit 20S to efficiently charge the battery 11 on the basis of the detection output dt of the charging-terminal-connection detection section 20D.

And in the same manner as the control section 36 of the battery protection section 30 according to the first embodiment, the control section 36A of the battery protection section 30A also controls the gate voltage of the discharge unit 37 to discharge from the battery 11.

Specifically, the control section 36A according to the second embodiment also controls the discharge unit 37 in the manner shown in FIG. 3. That is to say, as shown in FIG. 9, the control section 36A of the battery protection section 30A according to the second embodiment is supplied with detection outputs from the first voltage detection section 31, the second voltage detection section 32, and the temperature detection section 33.

If the detection output from the temperature detection section 33 is the low level, and the battery temperature of the battery 11 is less than a predetermined value (less than 60° C.), the control section 36 turns off the discharge unit 37 regardless of the battery voltage of the battery 11 as shown by the individual fields (D), (E), and (F) on the right side in FIG. 3.

In this case, the control section 36A changes the switch circuit in the control section 36 to select the input terminal c in order not to supply voltage to the gate terminal of the discharge unit 37, turning off the discharge unit 37. Thereby, discharging is not carried out from the battery 11, and if the battery 11 is being charged, the charging is continued.

Also, if the detection output from the temperature detection section 33 is the high level, and the battery temperature of the battery 11 is not less than a predetermined value (not less than 60° C.), the control section 36 further refers to the detection outputs from the first and the second voltage detection sections 31 and 32.

And it is assumed that the battery temperature of the battery 11 is not less than the predetermined value (not less than 60° C.), and the battery voltage Vm of the battery 11 is not less than the second predetermined voltage value (not less than 4.15 V). In that case, as shown in (A) field in FIG. 3, the control section 36 changes the switch circuit in the control section 36 to select the input terminal a.

Thereby, a relatively high constant voltage is supplied to the gate terminal of the discharge unit 37, and thus a constant current flows through the discharge unit 37 irrelevantly of illuminance as shown in FIG. 4. In this case, high discharge is carried out from the battery 11, thereby rapidly preventing the battery 11 from deteriorating.

In this regard, at the time of discharging from the battery 11, the control section 36A controls the external charging circuit 20 and the solar charging circuit 20S not to charge the battery 11. Thereby, the battery 11 is controlled not to carry out discharging and charging, which are contradictory to each other, at the same time.

Also, it is assumed that the battery temperature of the battery 11 is not less than the predetermined value (not less than 60° C.), the battery voltage Vm of the battery 11 is not less than the first predetermined voltage value (not less than 3.8 V), and less than the second predetermined voltage value (less than 4.15 V). In this case, as shown in (B) field in FIG. 3, the control section 36 changes the switch circuit in the control section 36 to select the input terminal b.

Thereby, a voltage in accordance with the current illuminance detected by the illuminance detection section 34 is supplied to the gate terminal of the discharge unit 37, and as shown in FIG. 5, a current in accordance with the illuminance flows through the discharge circuit section 37. In this case, discharging from the battery 11 is carried out in accordance with illuminance.

In this manner, in the control section 36A according to the second embodiment, in the same manner as the control section 36 according to the first embodiment, the discharge control processing described using FIGS. 3 and 7 is carried out.

Accordingly, in the mobile telephone terminal 1A according to the second embodiment, by the function of the battery protection section 30A, it is possible to prevent a state in which the battery 11 deteriorates rapidly with the conditions of the battery temperature and the battery voltage of the battery 11, and to adequately protect the battery from deterioration.

In particular, the mobile telephone terminal 1A according to the second embodiment is equipped with a solar cell 40 so that it is thought that there are many occasions where the terminal is often left under the scorching sun with strong sunshine (under high illuminance). However, as described above, the battery is adequately protected from deterioration by the function of the battery protection section 30A. Accordingly, it is preferable for this feature to be applied to the mobile telephone terminal 1A according to the second embodiment, which is equipped with a solar cell.

Also, in the mobile telephone terminal 1A according to the second embodiment, it is also possible to limit the cases of discharging rapidly. Thereby, it is possible to reduce the cases of discharging from the battery 11 with a large current all at once. Thus, it is possible to reduce the cases where the discharge unit 37 generates heat, and gives thermal load to the charging battery to the utmost. That is to say, it is possible to reduce the cases where the discharge from the battery 11 gives thermal stress on the battery.

[Third Embodiment]

As described above, in the case of a lithium-ion battery, if the battery is charged at a high temperature of the battery of 50° C. or more, deterioration of the battery becomes significant. And the battery can be prevented from deterioration by decreasing the battery voltage to a predetermined level (for example, about 3.6 V).

And in the case of a lithium-ion battery, when swelling of a battery kept in an environment of 60° C. is measured by changing the battery voltage between 3.8 V and 4.2 V, it can be observed that the higher the battery voltage, the larger the swelling of the battery. In particular, if the battery voltage is 4.15 V or more, the swelling of the battery becomes significant.

Also, it can also be observed that the higher the storage temperature is, more significant the swelling of the battery becomes. And in the case of a mobile telephone terminal equipped with a solar cell, it has been observed that the battery temperature rises near 80° C. outdoors in the summer because the terminal is left in direct sunlight.

In consideration of these factors together, in order to reliably protect the battery from deterioration, it is desirable to control the battery voltage in a pre-stage of reaching a possible battery temperature at which the battery deteriorates rapidly (for example, 50° C.). Thus, the mobile telephone terminal according to a third embodiment is configured to control the battery voltage of the battery in a pre-stage of reaching a possible battery temperature at which the battery deteriorates rapidly.

Specifically, for a battery temperature, a first predetermined temperature value and a second predetermined temperature value are disposed as well. The first predetermined temperature value is a temperature to which the battery temperature might rise, for example, about 40° C. The first predetermined temperature value is a high temperature that seldom occurs except in a special environment. Also, the second predetermined temperature value is a temperature at which the battery might deteriorate rapidly in the case of a high battery voltage, for example, about 50° C.

And if the battery temperature is not less than the first predetermined temperature value (for example, not less than 40° C.) and less than the second predetermined temperature value (for example, less than 50° C.), and the battery voltage is not less than the first predetermined voltage value (for example, not less than 3.8 V), the battery is discharged in accordance with illuminance.

That is to say, if the battery temperature is not less than the first predetermined temperature value and less than the second predetermined temperature value, it is determined that it is highly possible that the battery temperature rises. In this case, if the battery voltage is not less than a constant value, the battery is discharged in accordance with the illuminance so that the battery is protected from deterioration in a pre-stage of the battery temperature reaching the second predetermined temperature value (for example, 50° C.).

In this manner, the mobile telephone terminal according to the third embodiment uses two predetermined temperature values, the first predetermined temperature value and the second predetermined temperature value. Accordingly, in the mobile telephone terminal according to the third embodiment, the configuration is different from the configurations of the temperature detection section 33 in the mobile telephone terminals 1 and 1A according to the above-described first and the second embodiments, and discharge control performed in the control section 36, 36A is different.

That is to say, in the case of not equipped with a solar cell, the mobile telephone terminal according to the third embodiment is configured in the same manner as the mobile telephone terminal 1 according to the first embodiment shown in FIGS. 1 and 2, but has different configuration of the temperature detection section 33 and the different processing contents of the control section 36.

In the same manner, in the case of equipped with a solar cell, the mobile telephone terminal according to the third embodiment is configured in the same manner as the mobile telephone terminal 1 according to the second embodiment shown in FIGS. 8 and 9, but has different configuration of the temperature detection section 33 and the different processing contents of the control section 36A.

Accordingly, the basic configuration of the mobile telephone terminal according to the third embodiment has the same configuration as those of the above-described mobile telephone terminals 1 and 1A according to the first and second embodiment. And, in the following, a description will be mainly given of parts which are different in the mobile telephone terminal according to the third embodiment from the parts of the mobile telephone terminals 1 and 1A according to the first and second embodiments.

Figure 10:
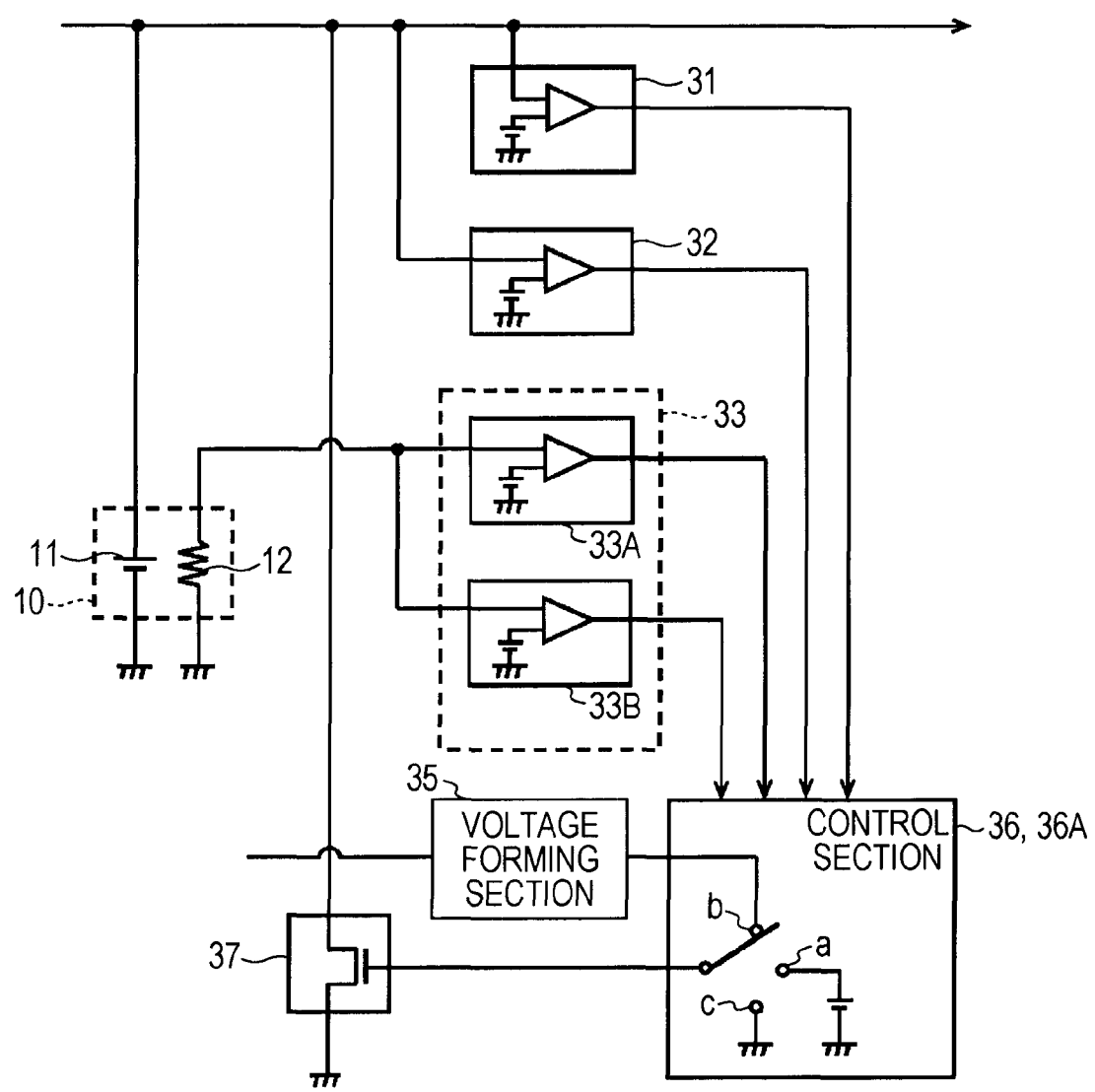
FIG. 10 is a block diagram for explaining a configuration of a battery protection section held by a mobile telephone terminal according to a third embodiment.

FIG. 10 is a block diagram for explaining configurations of the battery protection section 30, 30A held by the mobile telephone terminal according to the third embodiment. As shown in FIG. 10, in the battery protection section 30, 30A of the mobile telephone terminal according to the third embodiment, the configuration of the temperature detection section 33 is different from those of the temperature detection section 33 according to the first and the second embodiments.

As shown in FIG. 10, the temperature detection section 33 of the mobile telephone terminal according to the third embodiment includes a first temperature detection section 33A and a second temperature detection section 33B. The first temperature detection section 33A detects whether the battery temperature of the battery 11 is not less than the first predetermined temperature value (for example, not less than 40° C.). Also, the second temperature detection section 33B detects whether the battery temperature of the battery 11 is not less than the second predetermined temperature value (for example, not less than 50° C.).

And the control section 36, 36A of the battery protection section 30, 30A according to the third embodiment performs discharge control from the battery 11 on the basis of the detection outputs from the first temperature detection section 33A and the second temperature detection section 33B and the detection outputs from the first voltage detection section 31 and the second voltage detection section 32.

Except that the configuration of the temperature detection section 33 and the control of the control section 36, 36A are different, the other parts are configured in the same manner as the corresponding parts of the battery protection section 30, 30A according to the first and the second embodiments, described using FIGS. 2 and 9.

[Processing of Battery Protection Section 30, 30A According to the Third Embodiment]

A description will be specifically given of processing performed by the battery protection section 30, 30A according to the third embodiment. FIG. 11 is a diagram for explaining processing performed by the battery protection section 30, 30A in accordance with a battery temperature and a battery voltage of the battery 11.

The control section 36, 36A of the battery protection section 30, 30A is monitoring the detection outputs from the first temperature detection section 33A and the second temperature detection section 33B. And the control section 36, 36A determines that the battery 11 is not necessary to be discharged if the detection output from the temperature detection section 33A is a low level, and the battery temperature of the battery 11 is less than a predetermined value (for example, less than 40° C.). Because the battery 11 is not in a state of deterioration on the basis of the state of the battery temperature.

In this case, as shown by individual fields (d), (e), and (f) on the right side in FIG. 11, the control section 36 turns off the discharge unit 37 regardless of the battery voltage of the battery 11. Specifically, the control section 36, 36A changes the switch circuit in the control section 36, 36A to select the input terminal c in order not to supply a voltage to the gate terminal of the discharge unit 37, turning off the discharge unit 37. Thereby, discharging is not carried out from the battery 11, and if the battery 11 is being charged, the charging is continued.

Also, the control section 36, 36A determines that the battery 11 is necessary to be discharged if the detection output from the first temperature detection section 33A is the high level, and the detection output from the second temperature detection section 33B is also the high level.

That is to say, that the detection output from the second temperature detection section 33B is also the high level means that the battery temperature of the battery 11 is not less than the second predetermined value (for example, not less than 50° C.) so that the possibility that it is necessary to discharge the battery 11 becomes high. In this case, the control section 36 further refers to the detection output from the first and the second voltage detection sections 31, 32.

And it is assumed that the detection output from the second voltage detection section 32 is also the high level, and the battery voltage Vm of the battery 11 is not less than the second predetermined voltage value (not less than 4.15 V). That is to say, it is assumed that the battery temperature of the battery 11 is not less than the predetermined value (not less than 60° C.), and the battery voltage Vm of the battery 11 is not less than the second predetermined voltage value (not less than 4.15 V).

In that state, the battery 11 deteriorates rapidly. Accordingly, as shown in (A) field in FIG. 11, the control section 36, 36A changes the switch circuit in the control section 36, 36A to select the input terminal a.

Thereby, a relatively high constant voltage is supplied to the gate terminal of the discharge unit 37, and thus a constant current flows through the discharge unit 37 irrelevantly of illuminance in a manner shown in FIG. 4 described above. In this case, high discharge is carried out from the battery 11, thereby rapidly preventing the battery 11 from deteriorating.

In this regard, at the time of discharging from the battery 11, the control section 36, 36A controls the charging circuit 20, etc., not to charge the battery 11. Thereby, the battery 11 is controlled not to carry out discharging and charging, which are contradictory to each other, at the same time.

Also, it is assumed that the detection output from the second temperature detection section 33B is the high level, and the battery temperature of the battery 11 is not less than the predetermined value (not less than 50° C.), but the detection output of the first voltage detection section 31 is the high level, and the detection output of the second voltage detection section 32 is the low level.

That is to say, it is assumed that the battery temperature of the battery 11 is not less than the predetermined value (not less than 50° C.), and the battery voltage Vm of the battery 11 is not less than the first predetermined voltage value (not less than 3.8 V) and less than the second predetermined voltage value (less than 4.15 V).

In this case, the battery 11 is not in the state of rapidly deteriorating, but if the battery temperature is maintained or increases, and the battery voltage is maintained, or increases, the possibility of the battery 11 deteriorating becomes high. Accordingly, as shown in (B) field in FIG. 11, the control section 36 changes the switch circuit in the control section 36, 36A to select the input terminal b.

Thereby, a voltage in accordance with the current illuminance detected by the illuminance detection section 34 or the power-generation illuminance detection section 34A is supplied to the gate terminal of the discharge unit 37, and as shown in FIG. 5, a current in accordance with the illuminance flows through the discharge circuit section 37. That is to say, discharging from the battery 11 is carried out in accordance with illuminance.

In this manner, when the temperature of the battery 11 is not less than the predetermined temperature value, and the battery voltage of the battery 11 is within a predetermined range, the battery 11 is not in the state of deteriorating quickly, but may change into a state of rapidly deteriorating depending on an increase in the battery temperature.

Accordingly, under the circumstances, the battery 11 is discharged within a minimum necessary range in accordance with the illuminance detected in real time. Thereby, it is possible to adequately control the battery voltage of the battery 11, and to reliably prevent the deterioration of the battery 11.

In this regard, as described above, at the time of discharging from the battery 11, the control section 36, 36A controls the charging circuit 20, etc., not to charge the battery 11. Thereby, the battery 11 is controlled not to carryout discharging and charging, which are contradictory to each other, at the same time.

Also, it is assumed that the detection output from the second temperature detection section 33B is the high level, and the detection output from the first voltage detection section 31 is the low level. That is to say, it is assumed that the battery temperature of the battery 11 from the second temperature detection section 33 is not less than the second predetermined value (not less than 50° C.), and the battery voltage Vm of the battery 11 is not higher than the first predetermined voltage value (not higher than 3.8 V). In this case, the battery 11 is not in the state of rapidly deteriorating.

In this case, as shown by (C) field in FIG. 11, the control section 36, 36A turns off the discharge unit 37 regardless of the battery voltage of the battery 11. That is to say, the control section 36, 36A changes the switch circuit in the control section 36, 36A to select the input terminal c in order not to supply a voltage to the gate terminal of the discharge unit 37, turning off the discharge unit 37.

Thereby, discharging is not carried out from the battery 11, and if the battery 11 is being charged, the charging is continued. In this manner, even when the battery temperature of the battery 11 is not less than the second predetermined temperature value, if the battery voltage of the battery 11 is not higher than the first predetermined voltage value, unnecessary discharge of the battery 11 is not carried out.

The processing so far, that is to say, the processing shown in the individual fields of (a), (b), (c), (d), (e), and (f) in FIG. 11 is performed in the same manner and on the same condition as that of the processing shown in the individual fields of (A), (B), (C), (D), (E), and (F) in FIG. 3.

Further, in the mobile telephone terminal according to the third embodiment, the control section 36, 36A determines that the battery 11 is necessary to be discharged if the detection output from the first temperature detection section 33A is the high level, but the detection output from the second temperature detection section 33B is the low level.

That is to say, if the detection output from the first temperature detection section 33A is the high level, but the detection output from the second temperature detection section 33B is low level, the battery temperature of the battery 11 is not less than the first predetermined temperature value (for example, not less than 40° C.), and the second predetermined temperature value is less than (for example, less than 50° C.). In this case, there is a high possibility that the temperature of the battery rises, and the battery is in a state of reaching the second predetermined temperature value (50° C.) with a high possibility.

In this case, the control section 36 further refers to the detection output from the first voltage detection section 31. And it is assumed that the detection output of the first voltage detection section 32 is the high level, and the battery voltage Vm of the battery 11 is not less than the first predetermined voltage value (not less than 3.8 V).

In that state, there is a high possibility that the battery temperature of the battery 11 reaches the second predetermined temperature value at which the battery 11 deteriorates rapidly, and thus it is highly possible that the battery 11 deteriorates rapidly. Accordingly, as shown by individual fields of (g) and (h) in FIG. 11, the control section 36, 36A changes the switch circuit in the control section 36, 36A to select the input terminal b.

Thereby, in the same manner as (b) field in FIG. 11, a voltage in accordance with the current illuminance detected by the illuminance detection section 34 or a voltage in accordance with the current illuminance detected by the power-generation illuminance detection section 34A is supplied to the gate terminal of the discharge unit 37, and as shown in FIG. 5, a current in accordance with the illuminance flows through the discharge circuit section 37. That is to say, discharging from the battery 11 is carried out in accordance with illuminance.

In this manner, if the temperature of the battery 11 is not less than the first predetermined temperature value and less than the second predetermined temperature value, and the battery voltage of the battery 11 is higher than the first predetermined voltage value, the battery 11 is not in a state of deteriorating immediately, but may be changed to be in a state of deteriorating rapidly depending on an increase in the battery temperature.

Accordingly, under the circumstances, the battery 11 is discharged within a minimum necessary range in accordance with the illuminance detected in real time. Thereby, it is possible to adequately control the battery voltage of the battery 11, and to reliably prevent the deterioration of the battery 11 before the battery temperature of the battery 11 reaches the second predetermined temperature value.

In this regard, as described above, at the time of discharging from the battery 11, the control section 36, 36A controls the charging circuit 20, etc., not to charge the battery 11. Thereby, the battery 11 is controlled not to carry out discharging and charging, which are contradictory to each other, at the same time.

Also, it is assumed that the detection output from the first temperature detection section 33A is the high level, the detection output from the second temperature detection section 33B is the low level, and the detection output from the first voltage detection section 31 is the low level. It is assumed that the battery temperature of the battery 11 is not less than the first predetermined temperature value and less than the second predetermined temperature value, and the battery voltage of the battery 11 is less than the first predetermined voltage value.

In this case, although a possibility that the battery temperature of the battery 11 rises to the second predetermined temperature value is high, but the battery voltage of the battery 11 is low, and thus a possibility of the battery deteriorating rapidly is low.

Accordingly, as shown by (i) field in FIG. 11, the control section 36, 36A turns off the discharge unit 37 regardless of the battery voltage of the battery 11. That is to say, the control section 36, 36A changes the switch circuit in the control section 36, 36A to select the input terminal c in order not to supply a voltage to the gate terminal of the discharge unit 37, turning off the discharge unit 37.

Thereby, discharging is not carried out from the battery 11, and if the battery 11 is being charged, the charging is continued. In this manner, even when the battery temperature of the battery 11 is not less than the second predetermined temperature value, if the battery voltage of the battery 11 is not higher than the first predetermined voltage value, unnecessary discharge of the battery 11 is not carried out.

In this manner, in the mobile telephone terminal according to the third embodiment, if the battery temperature of the battery 11 is within a predetermined range, the control section 36, 36A of the battery protection section 30, 30A performs processing shown in individual fields in FIG. 11 in accordance with the battery voltage of the battery 11.

Thereby, it is possible for the control section 36, 36A to effectively control the battery voltage of the battery 11 to prevent deterioration in a pre-stage of the battery temperature of the battery 11 reaching the second predetermined temperature value (50° C.), at which the battery 11 deteriorates rapidly.

In this regard, the control section 36, 36A is monitoring the detection output from the first and the second temperature detection section 33A, 33B and the detection outputs of the first and the second voltage detection sections 31 and 32 all the time. As described above, it is possible to control the discharge unit 37 to discharge from the battery 11 in accordance with the state of the battery temperature and the battery voltage, and to stop the discharge from the battery 11. That is to say, it is possible to adequately control the battery voltage of the battery 11 in accordance with the battery temperature and the battery voltage of the battery all the time.

[Summary of Processing of the Battery Protection Section 30]

Figure 12:
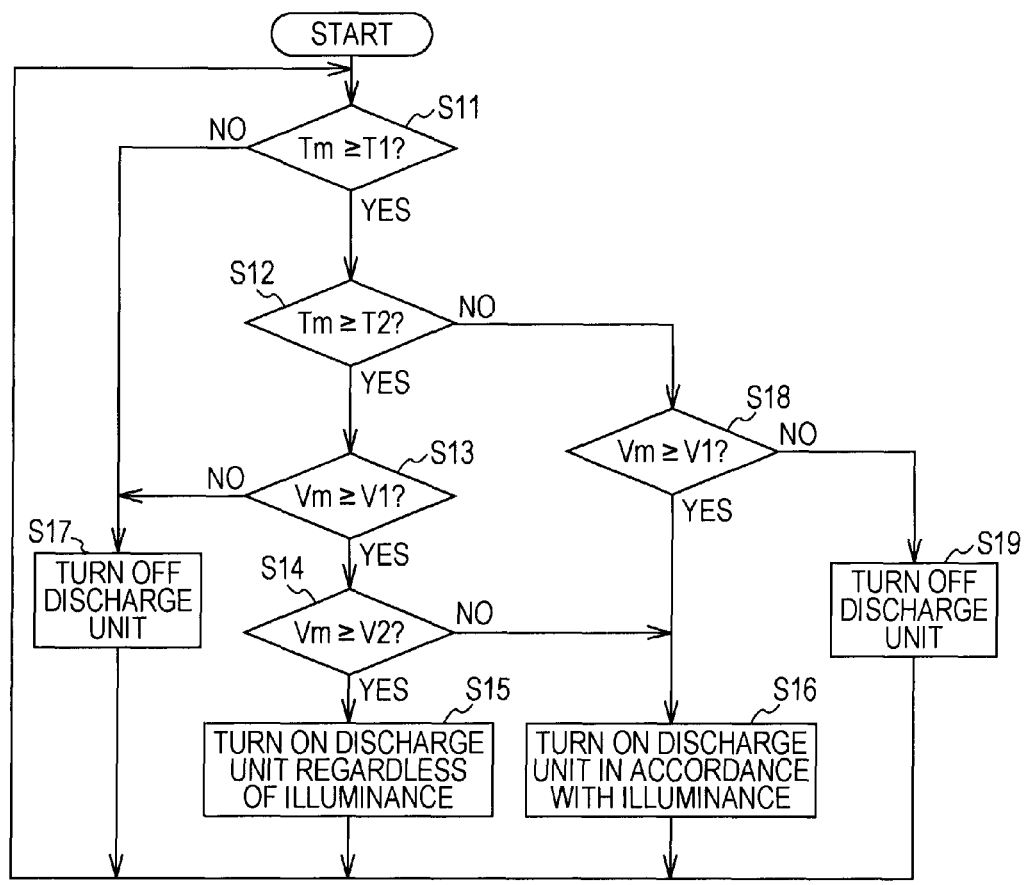
FIG. 12 is a flowchart for explaining processing performed mainly in a control section of the battery protection section of the mobile telephone terminal according to the third embodiment.

Next, a summary will be given of the processing performed by the battery protection section 30, 30A of the mobile telephone terminal 1 according to the third embodiment with reference to a flowchart in FIG. 12. FIG. 12 is a flowchart for explaining processing performed mainly in the control section 36, 36A of the battery protection section 30, 30A of the mobile telephone terminal 1 according to the third embodiment.

The processing shown in FIG. 12 is processing for protecting the battery 11. Thus, the processing shown in FIG. 7 may be performed in the case where the conditions, such as a battery temperature, illuminance, etc., satisfy predetermined conditions.

However, here, a description will be given on the assumption that the processing shown in FIG. 12 is performed mainly by the control section 36, 36A all the time when the battery 11 is connected to the mobile telephone terminal 1 in order to ensure protection against deterioration of the battery 11.

And, in the flowchart shown in FIG. 12, a reference letter Tm denotes a battery temperature of the battery 11, and a reference letter Vm denotes a battery voltage of the battery 11. A reference letter T1 denotes a first predetermined temperature value determined in advance, and is, for example, 40° C. Also, a reference letter T2 denotes a second predetermined temperature value determined in advance, and is, for example, 50° C. That is to say, it is determined that the first predetermined voltage value V1<the second predetermined voltage value V2.

Also, a reference letter V1 denotes the first predetermined voltage value determined in advance, and for example, is 3.8 V. A reference letter V2 denotes a second predetermined voltage value determined in advance, and for example, is 4.15 V. That is to say, it is determined that the first predetermined voltage value V1<the second predetermined voltage value V2.

And mobile when the battery 11 is connected to the telephone terminal 1, the control section 36, 36A executes the processing shown in FIG. 12. First, the control section 36, 36A determines whether the battery temperature Tm of the battery 11 detected by the temperature detection section 33 is not less than the first predetermined temperature value T1 on the basis of the detection output from the first temperature detection section 33A (step S11). The determination processing in step S11 is processing which determines whether the detection output from the first temperature detection section 33A is the high level or not.

In the determination processing in step S11, if determined that the battery temperature Tm is not less than the first predetermined temperature value T1, the control section 36, 36A determines whether the battery temperature Tm of the battery 11 is not less than the second predetermined temperature value T2 on the basis of the detection output from the second temperature detection section 33B (step S12). The determination processing in step S12 is processing which determines whether the detection output from the second temperature detection section 33B is the high level or not.

In the determination processing in step S12, if determined that the battery temperature of the battery 11 is not less than the second predetermined temperature value, the control section 36, 36A further determines whether the battery voltage Vm of the battery 11 is not less than the first predetermined voltage value V1 or not (step S13). The determination processing in step S13 is processing which determines whether the detection output from the first voltage detection section 31 is the high level or not.

In the determination processing in step S13, if the battery voltage Vm of the battery 11 is not less than the first predetermined voltage value V1, the control section 36, 36A further determines whether the battery voltage Vm of the battery 11 is not less than the second predetermined voltage value V2 (step S14). The determination processing in step S14 is processing which determines whether the detection output from the second voltage detection section 32 is the high level or not.

In the determination processing in step S14, if determined that the battery voltage Vm of the battery 11 is not less than the second predetermined voltage value V2, since the battery temperature Tm is not less than the second predetermined temperature value T2, the battery 11 is determined to be in a state of deteriorating rapidly.

In this case, the control section 36, 36A turns on the discharge unit 37 irrelevantly of illuminance to carry out high discharge from the battery 11 (step S15). That is to say, in step S15, the processing shown in (a) field in FIG. 11 is performed. Specifically, in step S15, the control section 36, 36A changes the switch circuit of the control section 36, 36A to select the input terminal a.

Thereby, a relatively high constant voltage is supplied to the gate terminal of the discharge unit 37, and thus a constant current is allowed to flow through the source-drain terminals of the discharge unit 37 irrelevantly of illuminance as shown in FIG. 4, carrying out high discharge from the battery 11. Thereby, it is possible to restrain the deterioration of the battery 11.

Also, in the determination processing in step S14, if determined that the battery voltage Vm of the battery 11 is less than the second predetermined voltage value V2, it is understood that the battery temperature Tm is not less than the second predetermined temperature value T2, and the battery voltage Vm is not less than the first predetermined value V1 and less than the second predetermined value V2.

In this case, the control section 36, 36A turns on the discharge unit 37 in accordance with the illuminance, and discharges from the battery 11 in accordance with the illuminance (step S16). That is to say, in step S16, the processing shown in (b) field in FIG. 11 is performed. Specifically, in step S16, the control section 36, 36A changes the switch circuit of the control section 36, 36A to select the input terminal b.

Thereby, a voltage in accordance with the illuminance detected by the illuminance detection section 34, etc., is supplied from the voltage forming section 35 to the gate terminal of the discharge unit 37, and as shown in FIG. 5, a current in accordance with the illuminance flows through the source-drain terminals of the discharge unit 37.

Accordingly, a minimum necessary amount of discharge is carried out from the battery 11, and rapid deterioration of the battery 11 is prevented, thereby adequately allowing protecting the battery 11 from deterioration.

Also, as shown in FIG. 12, in the determination processing in step S11, if determined that the battery temperature Tm is less than the first predetermined temperature value T1, the discharge unit 37 is turned off (step S17). In the same manner, in the determination processing in step S13, if determined that the battery voltage Vm of the battery 11 is less than the first predetermined voltage value V1, the discharge unit 37 is turned off (step S17).

In step S17, the control section 36 performs processing shown in the above-described individual fields (c), (d), (e), and (f) in FIG. 11. Specifically, in step S17, the control section 36, 36A changes the switch circuit of the control section 36, 36A to the input terminal c so as not to supply a voltage to the base terminal of the discharge unit 37, turning off the discharge unit 37. Thereby, the discharge from the battery 11 is not carried out by the discharge unit 37.

Also, in the determination processing in step S12, if determined that the battery temperature of the battery 11 is less than the second predetermined temperature value, the control section 36, 36A further determines whether the battery voltage Vm of the battery 11 is not less than the first predetermined voltage value V1 or not (step S18). In the same manner as the processing is step S13, the determination processing in step S18 is processing which determines whether the detection output from the first voltage detection section 31 is the high level or not.

In the determination processing in step S18, if determined that the battery voltage Vm of the battery 11 is not less than the first predetermined voltage value V1, the control section 36, 36A turns on the discharge unit 37 in accordance with illuminance, and discharges from the battery 11 in accordance with the illuminance (step S16). That is to say, in step S16, processing shown in the individual fields of (g) and (h) in FIG. 11 is performed. The processing shown in the individual fields of (g) and (h) in FIG. 11 is the same as the processing shown in (b) field in FIG. 11. Specifically, in step S16, the control section 36, 36A changes the switch circuit of the control section 36, 36A to select the input terminal b.

Thereby, a voltage in accordance with the illuminance detected by the illuminance detection section 34, etc., is supplied from the voltage forming section 35 to the gate terminal of the discharge unit 37, and as shown in FIG. 5, a current in accordance with the illuminance flows through the source-drain terminals of the discharge unit 37.

Accordingly, a minimum necessary amount of discharge is carried out from the battery 11, and rapid deterioration of the battery 11 is prevented, thereby adequately allowing protecting the battery 11 from deterioration.

Also, as shown in FIG. 12, in the determination processing in step S18, if determined that the battery temperature Tm is less than the first predetermined temperature value T1, the discharge unit 37 is turned off (step S19). The processing in step S19 is the same as the processing in step S17. In step S19, the control section 36, 36A performs processing shown in (i) field in FIG. 11.

Specifically, in step S17, the control section 36, 36A changes the switch circuit of the control section 36, 36A to the input terminal c so as not to supply a voltage to the base terminal of the discharge unit 37, turning off the discharge unit 37. Thereby, the discharge from the battery 11 is not carried out by the discharge unit 37.

And after the processing in step S15, step S16, step S17, and step S19, processing from step S11, shown in FIG. 12, is repeated.

In this manner, in the mobile telephone terminal according to the third embodiment, in a pre-stage of the battery temperature of the battery 11 reaching the second predetermined temperature value, it is possible to control discharge of the battery 11, and thus to adequately prevent deterioration of the battery.

Also, in the mobile telephone terminal 1A according to the second embodiment, it is also possible to limit the cases of discharging rapidly. Thereby, it is possible to reduce the cases of discharging from the battery 11 with a large current all at once. Thus, it is possible to reduce the cases where the discharge unit 37 generates heat, and gives thermal load to the charging battery to the utmost. That is to say, it is possible to reduce the cases where the discharge from the battery 11 gives thermal stress on the battery.

[Method and Program According to an Embodiment]

And a method corresponding to the discharge control processing, described using flowcharts of FIGS. 7 and 12, performed by the control section 36, 36A is a method of protecting a battery according to an embodiment. Also, a program to be executed in the control section 36, 36A, corresponding to the flowcharts of FIGS. 7 and 12, is a battery protection program according to an embodiment.

In this regard, in the above-described embodiments, the battery 11 corresponds to a battery, the thermistor 12 and the temperature detection section 33 achieve the function of the temperature detection means, and the first, and the second voltage detection sections 31 and 32 achieve the function of the voltage detection means.

Also, the discharge unit 37 including an FET achieves the function of the discharge means, and the illuminance detection section 34 and the power-generation illuminance detection section 34A achieves the function of the illuminance detection means. Also, the control section 36 and the control section 36A achieve the function of the control means.

Also, the solar cell 40 corresponds to a solar cell, and the wireless communication section 107 mainly achieves the function of a communication means.

[Others]

In this regard, in the above-described embodiments, a description has been given of an example which is applied to a mobile telephone terminal. However, the present disclosure is not limited to this. This disclosure can be applied to various kinds of terminal apparatuses, such as a mobile music playback apparatus, a mobile information terminal called a PDA (Personal Digital Assistants), etc., a notebook-sized personal computer, etc. That is to say, this disclosure is preferably applied to various kinds of mobile terminals equipped with a battery, which is a secondary battery, as a supply source of driving power.

Also, the predetermined temperature value Tt, the first predetermined temperature value T1, the second predetermined temperature value T2, the first predetermined voltage value V1, and the second predetermined voltage value V2, used in the above-described embodiment, can be adequately selected in accordance with the performance and the characteristics of a battery to be used.

Also, in the above-described embodiments, the state range of the battery voltage is identified such as not less than the first predetermined voltage value and less than the second predetermined voltage value, that is to say, (the first predetermined voltage value V1≤the battery voltage Vm<the second predetermined voltage value V2), for example. However, the present disclosure is not limited to this.

For example, the state range of the battery voltage may of course be defined such as higher than the first predetermined voltage value and not higher than the second predetermined voltage value, that is to say, (the first predetermined voltage value V1<the battery voltage Vm≤the second predetermined voltage value V2).

Also, the state range of the battery voltage may of course be defined such as higher than the first predetermined voltage value and less than the second predetermined voltage value, that is to say, (the first predetermined voltage value V1<the battery voltage Vm<the second predetermined voltage value V2).

In the same manner, for the range of the battery temperature, the state range of the battery temperature is identified such as not less than the first predetermined temperature value and less than the second predetermined temperature value, that is to say, (the first predetermined temperature value T1≤battery temperature Tm<the second predetermined temperature value T2). However, the present disclosure is not limited to this.

For example, the state range of the battery temperature may of course be defined such as higher than the first predetermined temperature value and not higher than the second predetermined temperature value, that is to say, (the first predetermined temperature value T1<the battery temperature Tm≤the second predetermined temperature value T2).

Also, the state range of the battery temperature may be of course defined such as higher than the first predetermined temperature value and less than the second predetermined temperature value, that is to say, (the first predetermined temperature value T1<the battery temperature Tm<the second predetermined temperature value T2).

In this manner, for the ranges of the battery voltage and the battery temperature, it is possible to make a selection from various ways, whether to include a predetermined value or not.

Also, in the above-described embodiments, the configurations of the first and the second voltage detection means 31, 32, the temperature detection means 33, and the first and the second temperature detection means 33A, 33B are only one example of the configurations, and various kinds of configurations can be employed.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile terminal apparatus comprising:
    a battery;
    a temperature detection section configured to detect a temperature of the battery;
    a voltage detection section configured to detect a battery voltage of the battery;
    a discharge section configured to discharge the battery;
    an illuminance detection section configured to detect an illuminance on the mobile terminal apparatus; and
    a control section configured to connect the discharge section to one of three different terminals based on the temperature detected from the temperature detection section and the battery voltage detected from the voltage detection section, wherein (i) when the battery temperature is not less than a predetermined value and the battery voltage is greater not less than a first predetermined voltage and less than a second predetermined voltage that is greater than the first predetermined voltage, the control section connects the discharge section to a first one of the three different terminals to gradually discharge the battery in accordance with the detected illuminance, (ii) when the battery temperature is not less than the predetermined value and the battery voltage is not less than the second predetermined voltage, the control section connects the discharge section to a second one of the three different terminals to rapidly discharge the battery, and (iii) when the battery temperature is less than the predetermined value and the battery voltage is less than the first predetermined voltage, the control section connects the discharge section to a third one of the three different terminals to turn off the discharge section.

2. The mobile terminal apparatus according to claim 1, further comprising a solar cell supplying charging power to the battery.

3. The mobile terminal apparatus according to claim 1, further comprising:
    a communication section for connecting to a mobile telephone network.

4. A method of protecting a battery, implemented on a mobile terminal apparatus having the battery, comprising:
    detecting, at a temperature detection section, a temperature of the battery;
    detecting, at a voltage detection section, a battery voltage of the battery;
    discharging, at a discharge section, the battery;
    detecting, at an illuminance detection section an illuminance on the mobile terminal apparatus; and
    connecting, at a control section, the discharge section to one of three different terminals based on the temperature detected from the temperature detection section and the battery voltage detected from the voltage detection section,
    wherein (i) when the battery temperature is not less than a predetermined value and the battery voltage is greater not less than a first predetermined voltage and less than a second predetermined voltage that is greater than the first predetermined voltage, the control section connects the discharge section to a first one of the three different terminals to gradually discharge the battery in accordance with the detected illuminance, (ii) when the battery temperature is not less than the predetermined value and the battery voltage is not less than the second predetermined voltage, the control section connects the discharge section to a second one of the three different terminals to rapidly discharge the battery, and (iii) when the battery temperature is less than the predetermined value and the battery voltage is less than the first predetermined voltage, the control section connects the discharge section to a third one of the three different terminals to turn off the discharge section.

5. A computer readable storage medium encoded with computer executable instructions, which when executed by a mobile terminal apparatus having a battery, cause the mobile terminal apparatus to perform a method of protecting the battery, comprising:
    detecting, at a temperature detection section, a temperature of the battery;
    detecting, at a voltage detection section, a battery voltage of the battery;
    discharging, at a discharge section, the battery;
    detecting, at an illuminance detection section an illuminance on the mobile terminal apparatus; and
    connecting, at a control section, the discharge section to one of three different terminals based on the temperature detected from the temperature detection section and the battery voltage detected from the voltage detection section, wherein (i) when the battery temperature is not less than a predetermined value and the battery voltage is greater not less than a first predetermined voltage and less than a second predetermined voltage that is greater than the first predetermined voltage, the control section connects the discharge section to a first one of the three different terminals to gradually discharge the battery in accordance with the detected illuminance, (ii) when the battery temperature is not less than the predetermined value and the battery voltage is not less than the second predetermined voltage, the control section connects the discharge section to a second one of the three different terminals to rapidly discharge the battery, and (iii) when the battery temperature is less than the predetermined value and the battery voltage is less than the first predetermined voltage, the control section connects the discharge section to a third one of the three different terminals to turn off the discharge section.

6. A mobile terminal apparatus comprising:
a battery;
a temperature detection means for detecting a temperature of the battery;
voltage detection means for detecting a battery voltage of the battery;
a discharge means for discharging the battery;
an illuminance detection means for detecting an illuminance on the mobile terminal apparatus; and
a control means for connecting the discharge means to one of three different terminals based on the temperature detected from the temperature detection means and the battery voltage detected from the voltage detection means, wherein (i) when the battery temperature is not less than a predetermined value and the battery voltage is greater not less than a first predetermined voltage and less than a second predetermined voltage that is greater than the first predetermined voltage, the control means connects the discharge means to a first one of the three different terminals to gradually discharge the battery in accordance with the detected illuminance, (ii) when the battery temperature is not less than the predetermined value and the battery voltage is not less than the second predetermined voltage, the control means connects the discharge section to a second one of the three different terminals to rapidly discharge the battery, and (iii) when the battery temperature is less than the predetermined value and the battery voltage is less than the first predetermined voltage, the control section connects the discharge means to a third one of the three different terminals to turn off the discharge means.

* * * * *